United States Patent
Mori

(10) Patent No.: US 9,860,475 B2
(45) Date of Patent: Jan. 2, 2018

(54) VIDEO PROCESSING APPARATUS, VIDEO PROCESSING METHOD, AND STORAGE MEDIUM

(71) Applicant: CANON KABUSHIKI KAISHA, Tokyo (JP)

(72) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/150,140

(22) Filed: May 9, 2016

(65) Prior Publication Data

US 2016/0353053 A1 Dec. 1, 2016

(30) Foreign Application Priority Data

May 29, 2015 (JP) .................................. 2015-110216

(51) Int. Cl.
| | |
|---|---|
| *G11B 27/00* | (2006.01) |
| *H04N 5/93* | (2006.01) |
| *H04N 5/77* | (2006.01) |
| *H04N 9/80* | (2006.01) |
| *H04N 5/445* | (2011.01) |
| *G11B 27/34* | (2006.01) |
| *H04N 9/82* | (2006.01) |

(52) U.S. Cl.
CPC ............. *H04N 5/445* (2013.01); *G11B 27/34* (2013.01); *H04N 5/77* (2013.01); *H04N 9/8233* (2013.01)

(58) Field of Classification Search
USPC .................................................. 386/278–290
See application file for complete search history.

(56) References Cited

U.S. PATENT DOCUMENTS

| | | | |
|---|---|---|---|
| 2004/0071441 A1* | 4/2004 | Foreman | G06F 3/0483 386/282 |
| 2005/0257137 A1* | 11/2005 | Weber | G06F 17/3082 715/201 |
| 2007/0154189 A1* | 7/2007 | Harradine | G06Q 30/02 386/241 |
| 2008/0240671 A1* | 10/2008 | Yamasaki | G06F 17/30796 386/240 |
| 2009/0080853 A1* | 3/2009 | Chen | G06F 17/30787 386/241 |
| 2009/0096891 A1* | 4/2009 | Jacumet | H04N 9/8233 348/231.3 |
| 2013/0249906 A1* | 9/2013 | Gunderson | G06T 15/20 345/420 |

(Continued)

FOREIGN PATENT DOCUMENTS

| | | |
|---|---|---|
| JP | H09-149307 A | 6/1997 |
| JP | 2003-530034 A | 10/2003 |

(Continued)

*Primary Examiner* — Hung Dang
(74) *Attorney, Agent, or Firm* — Canon U.S.A., Inc. IP Division

(57) ABSTRACT

A video processing apparatus includes an acquisition unit configured to acquire annotation information corresponding to at least one associated video, which is associated with a video that is to be processed, and a display control unit configured to perform control to display, on a display screen for displaying the video that is to be processed, both the annotation information corresponding to the associated video acquired by the acquisition unit and the video that is to be processed.

11 Claims, 21 Drawing Sheets

(56) References Cited

U.S. PATENT DOCUMENTS

| | | | | |
|---|---|---|---|---|
| 2014/0023341 A1* | 1/2014 | Wang | ...................... | H04N 9/87 386/240 |
| 2014/0344853 A1* | 11/2014 | Maruyama | ......... | H04N 21/8133 725/32 |
| 2014/0369665 A1* | 12/2014 | Nakajima | .............. | H04N 5/772 386/241 |
| 2015/0222682 A1* | 8/2015 | Lewis | .............. | H04N 21/44016 715/719 |
| 2015/0310896 A1* | 10/2015 | Bredow | ................ | G06F 3/0488 386/230 |
| 2016/0267067 A1* | 9/2016 | Mays | ...................... | G06F 17/30 |

FOREIGN PATENT DOCUMENTS

| | | |
|---|---|---|
| JP | 2004-187275 A | 7/2004 |
| JP | 2006-094508 A | 4/2006 |

\* cited by examiner

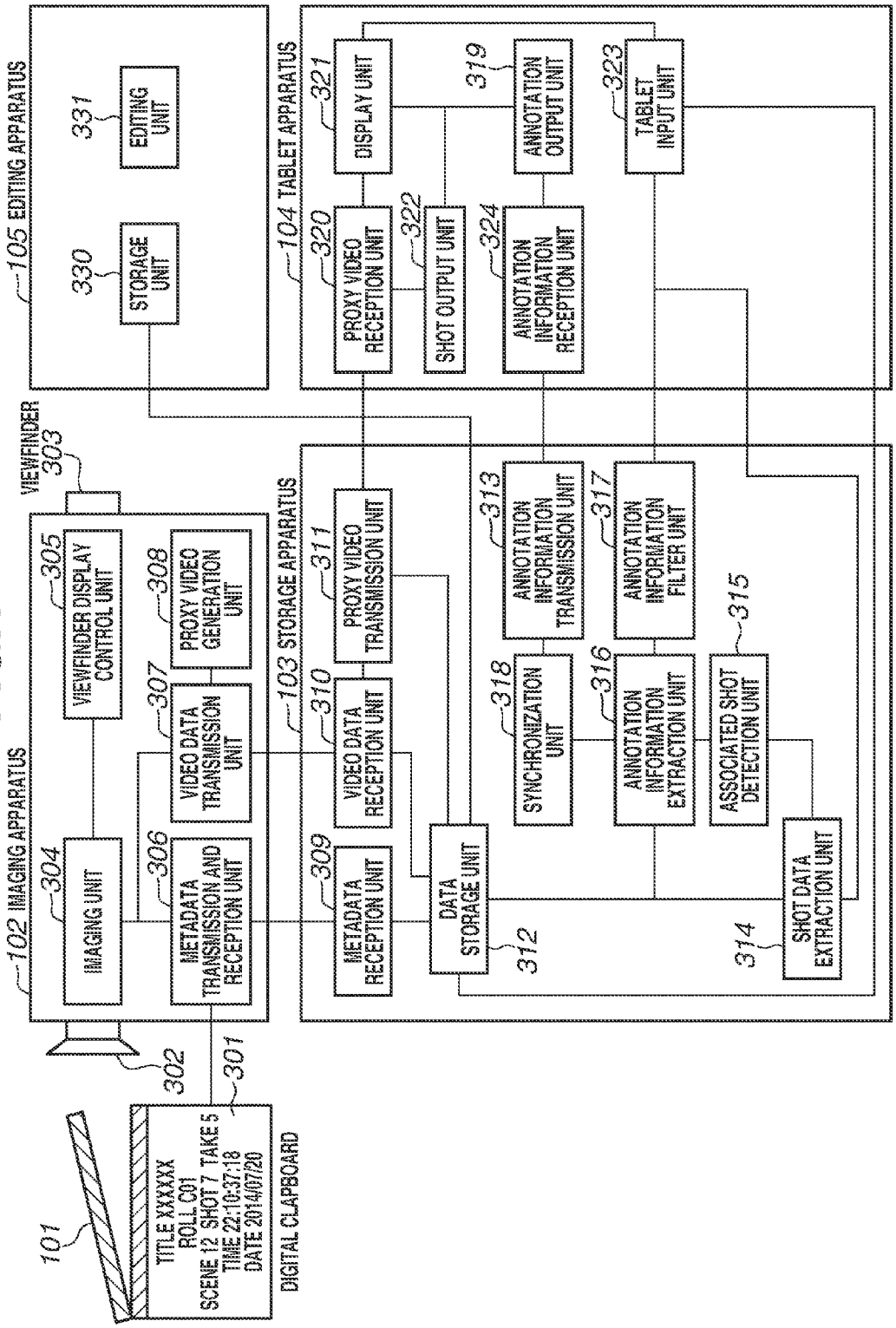

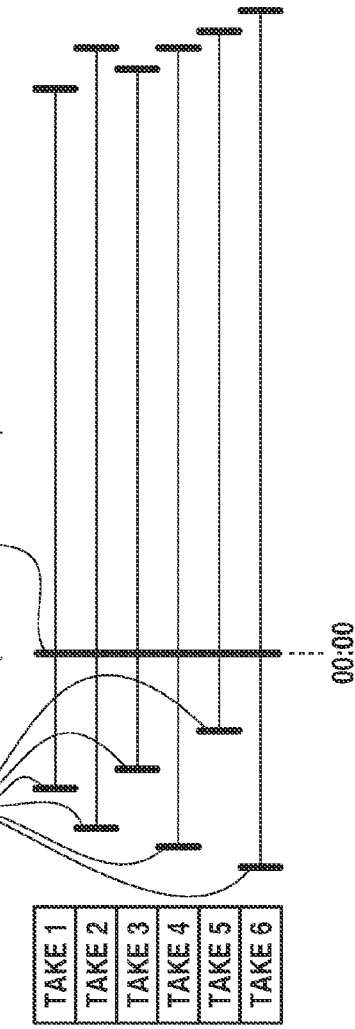

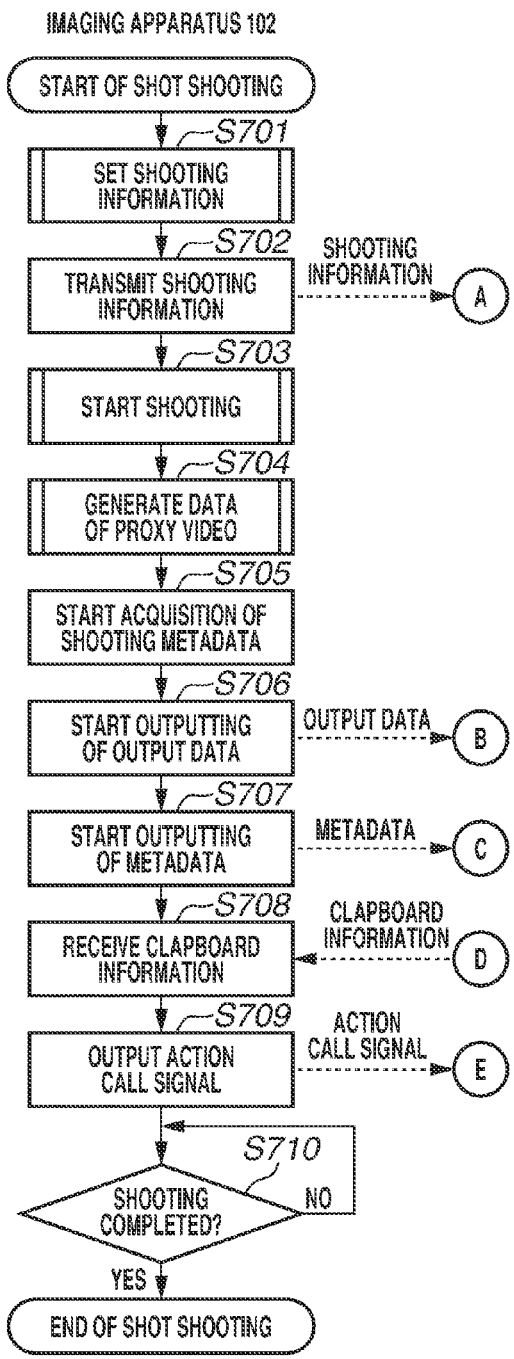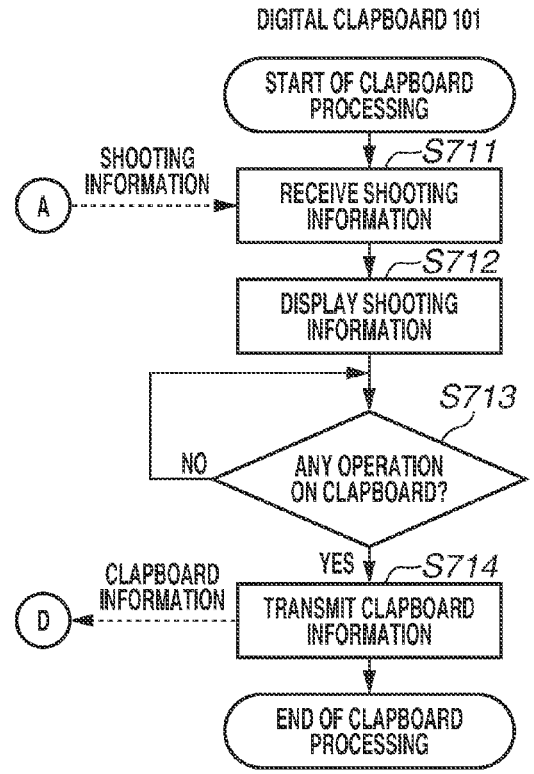

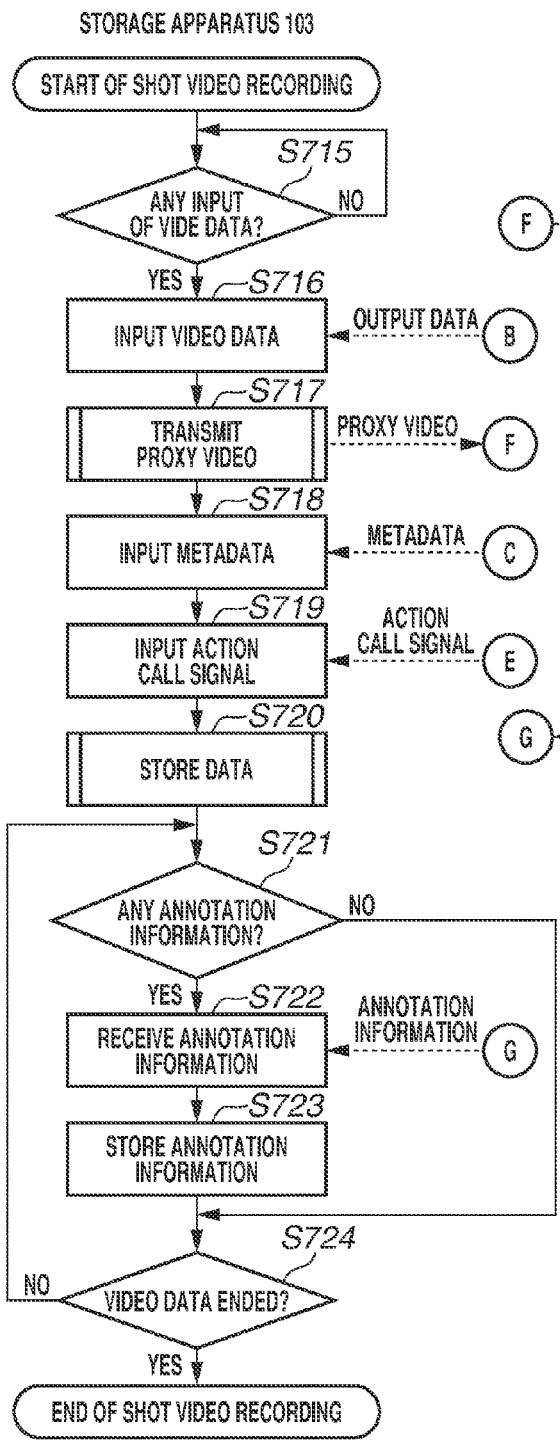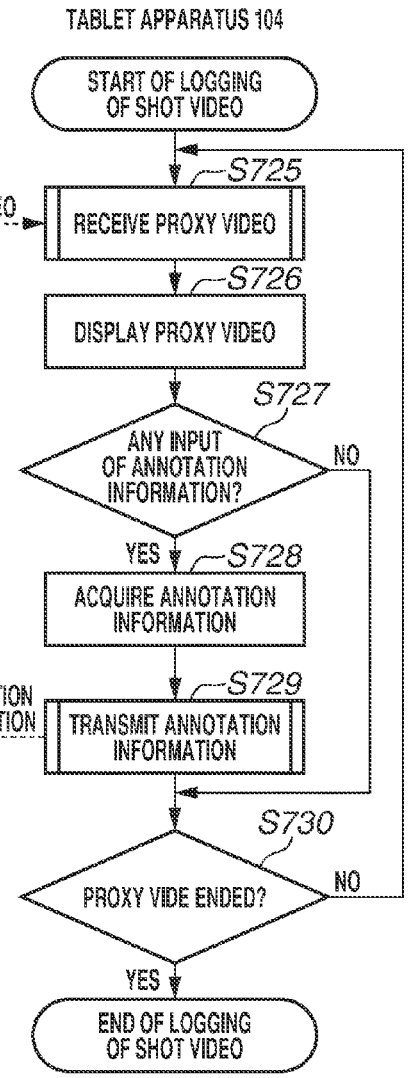

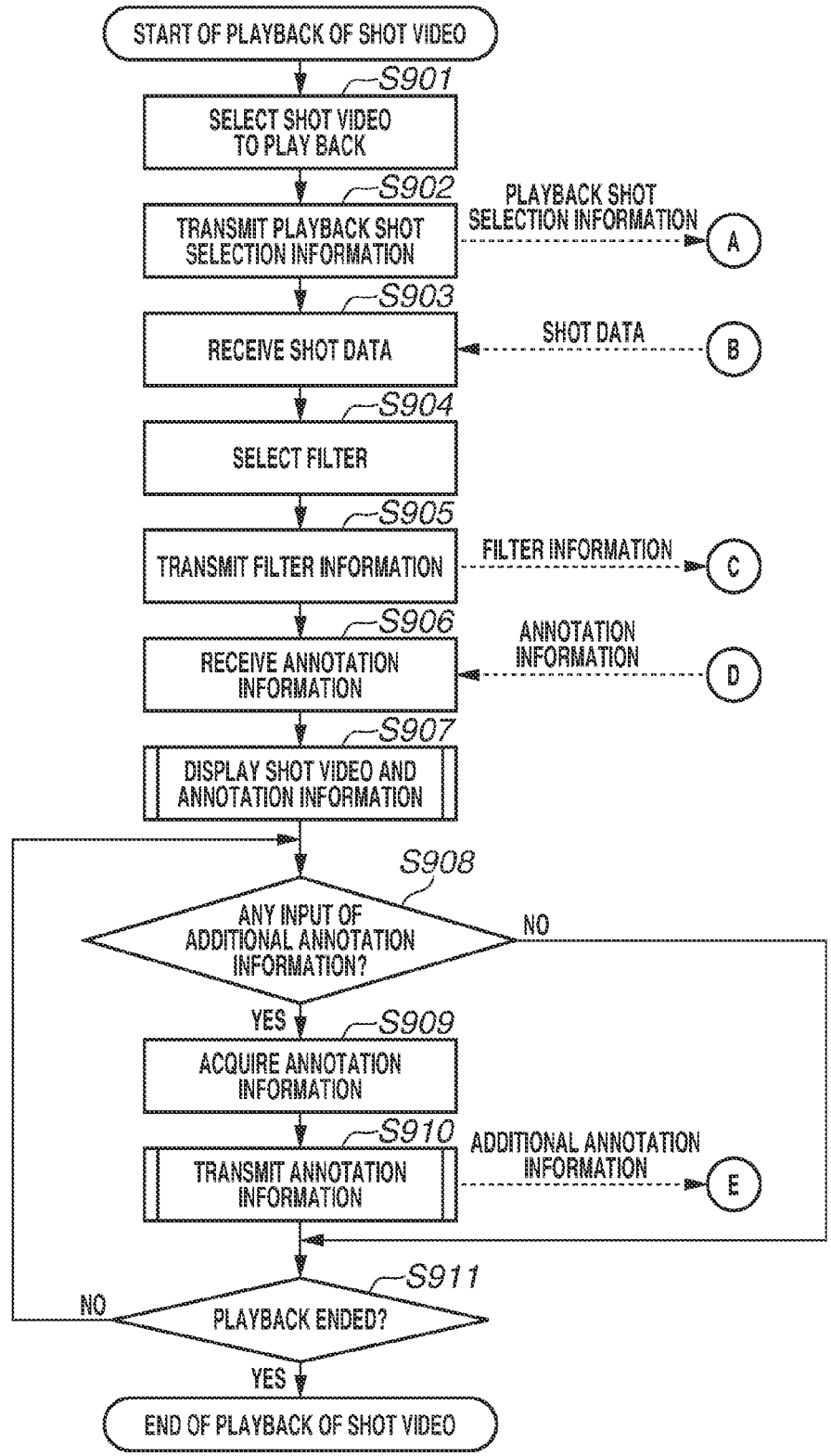

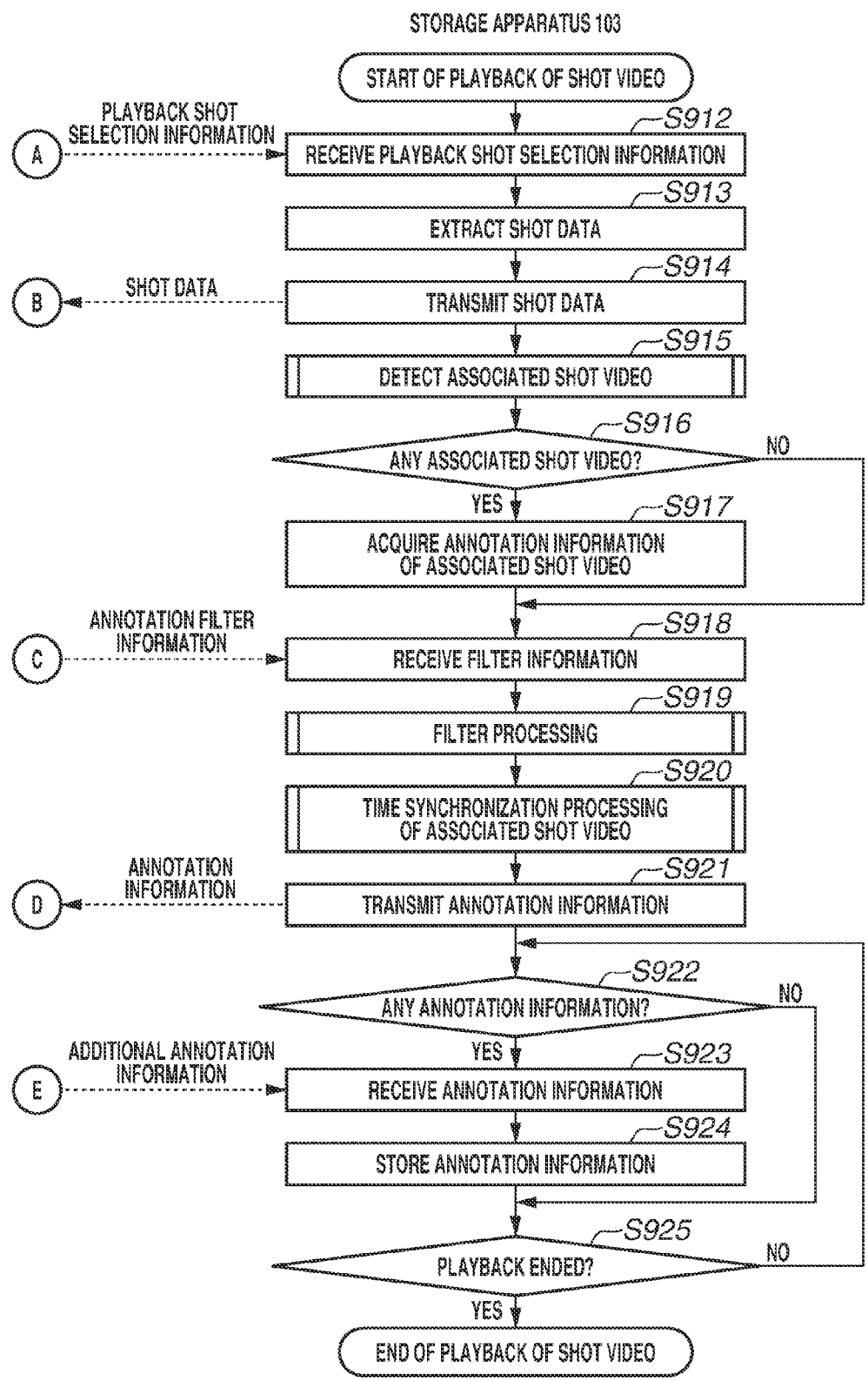

FIG.10

| SHOT ID | ANNOTATION ID | START TIME | END TIME | X COORDINATE | Y COORDINATE | OTHERS (POSITION) | GOOD/NG | BROAD CATEGORY | NARROW CATEGORY | COMMENT |
|---|---|---|---|---|---|---|---|---|---|---|
| RC01-S12-S07-T5 | 0016 | 00:03:38:10 | 00:03:39:10 | 800 | 300 | – | GOOD | ACTOR | ACTING | |
| RC01-S12-S07-T5 | 0017 | 00:04:30:15 | 00:04:31:15 | 200 | 500 | – | NG | QUALITY | OUT OF FOCUS | |
| RC01-S12-S07-T6 | 0018 | – | – | – | – | – | NG | CAMERAWORK | – | |
| RC01-S12-S08-T1 | 0019 | 00:00:45:20 | 00:00:46:20 | – | – | RIGHT END | NG | BACKGROUND | APPEARANCE OF UNEXPECTED OBJECT IN VIDEO | |
| RC01-S12-S08-T2 | 0020 | – | – | – | – | – | GOOD | GENERAL | – | |
| RC01-S12-S09-T1 | 0021 | 00:00:32:22 | 00:00:33:22 | – | – | CENTER | GOOD | ACTOR | ACTING | |
| RC01-S12-S09-T1 | 0022 | 00:01:01:07 | 00:01:02:07 | 50 | 100 | – | NG | ACTOR | MISTAKE IN LINES | |
| RC01-S12-S09-T1 | 0023 | 00:01:14:15 | 00:01:15:15 | – | – | – | GOOD | CAMERAWORK | – | |
| RC01-S12-S09-T2 | 0024 | 00:00:31:20 | 00:00:32:20 | 900 | 500 | – | GOOD | ACTOR | ACTING | |
| RC01-S12-S09-T2 | 0025 | 00:01:02:11 | 00:01:03:11 | 300 | 600 | – | GOOD | QUALITY | – | |
| RC01-S12-S09-T2 | 0026 | 00:00:32:10 | 00:00:33:10 | 900 | 500 | – | GOOD | ACTOR | ACTING | |
| RC01-S12-S09-T3 | 0027 | 00:00:14:10 | 00:00:15:10 | – | – | – | GOOD | CAMERAWORK | – | |
| RC01-S12-S09-T3 | 0028 | 00:00:32:09 | 00:00:33:09 | 900 | 500 | – | GOOD | ACTOR | ACTING | |
| RC01-S12-S09-T4 | 0029 | 00:00:15:17 | 00:00:16:17 | 1900 | 50 | – | NG | BACKGROUND | APPEARANCE OF UNEXPECTED OBJECT IN VIDEO | OTHER TAKES ARE ALSO WORTH CHECKING OUT. |
| RC01-S12-S09-T5 | 0030 | 00:00:32:04 | 00:00:33:04 | 900 | 500 | – | NG | ACTOR | ACTING | |
| RC01-S12-S10-T1 | 0031 | – | – | – | – | – | GOOD | GENERAL | – | |

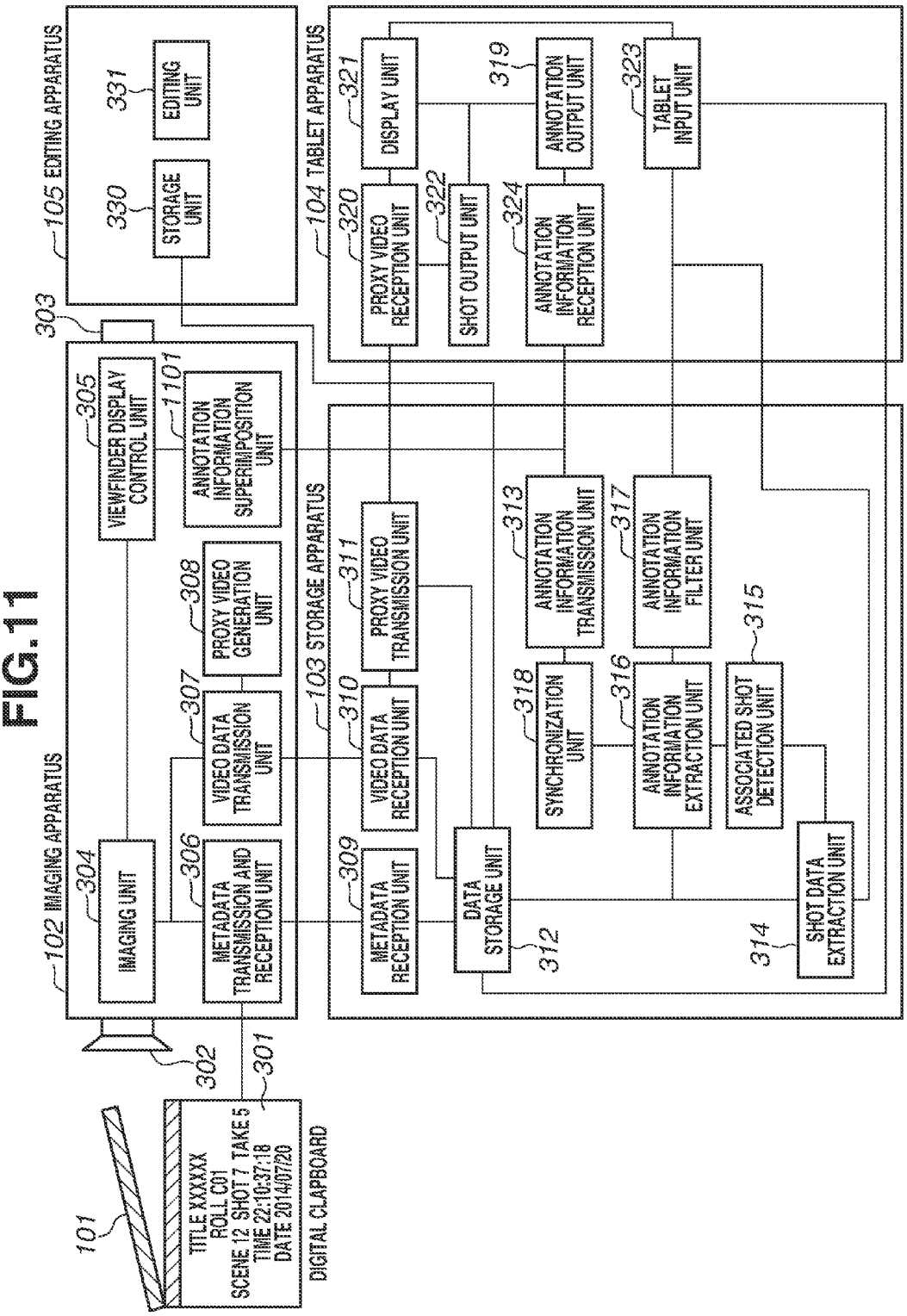

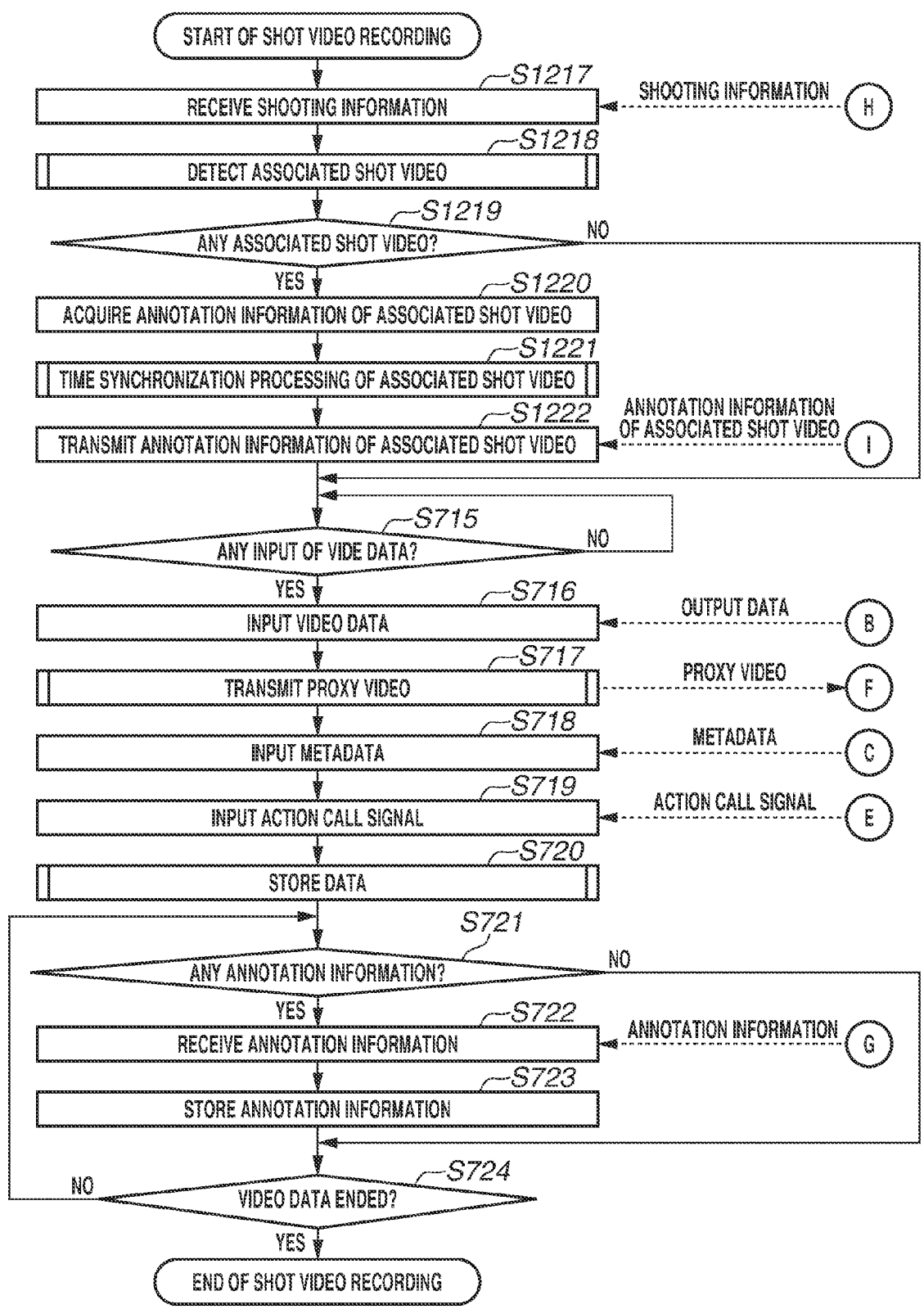

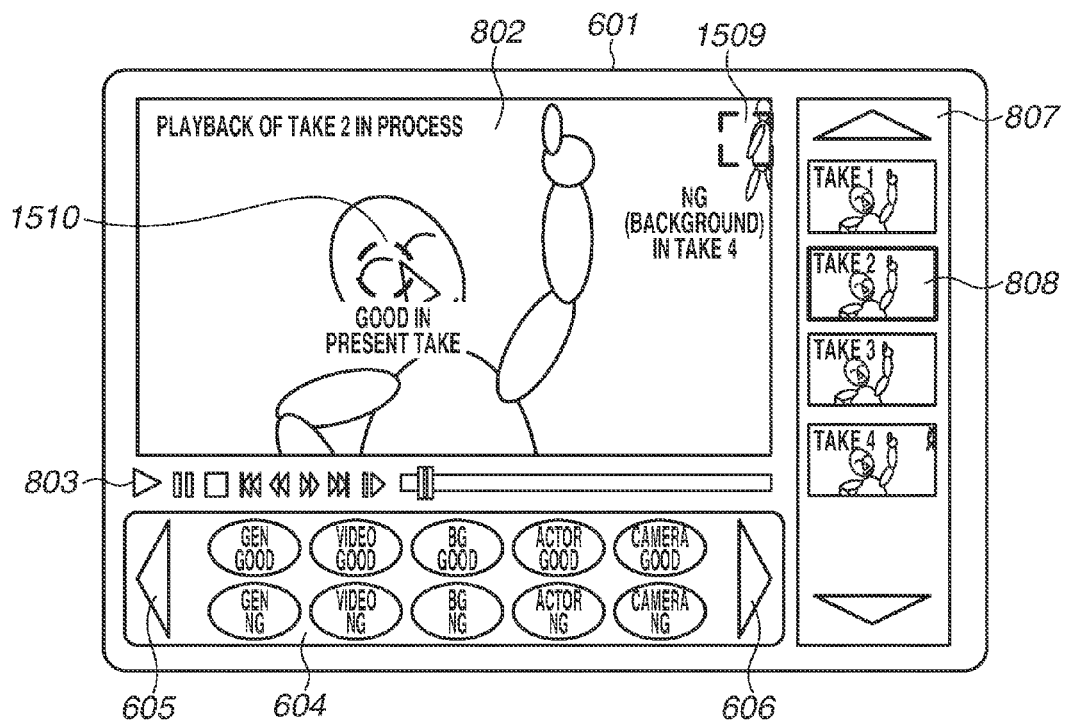

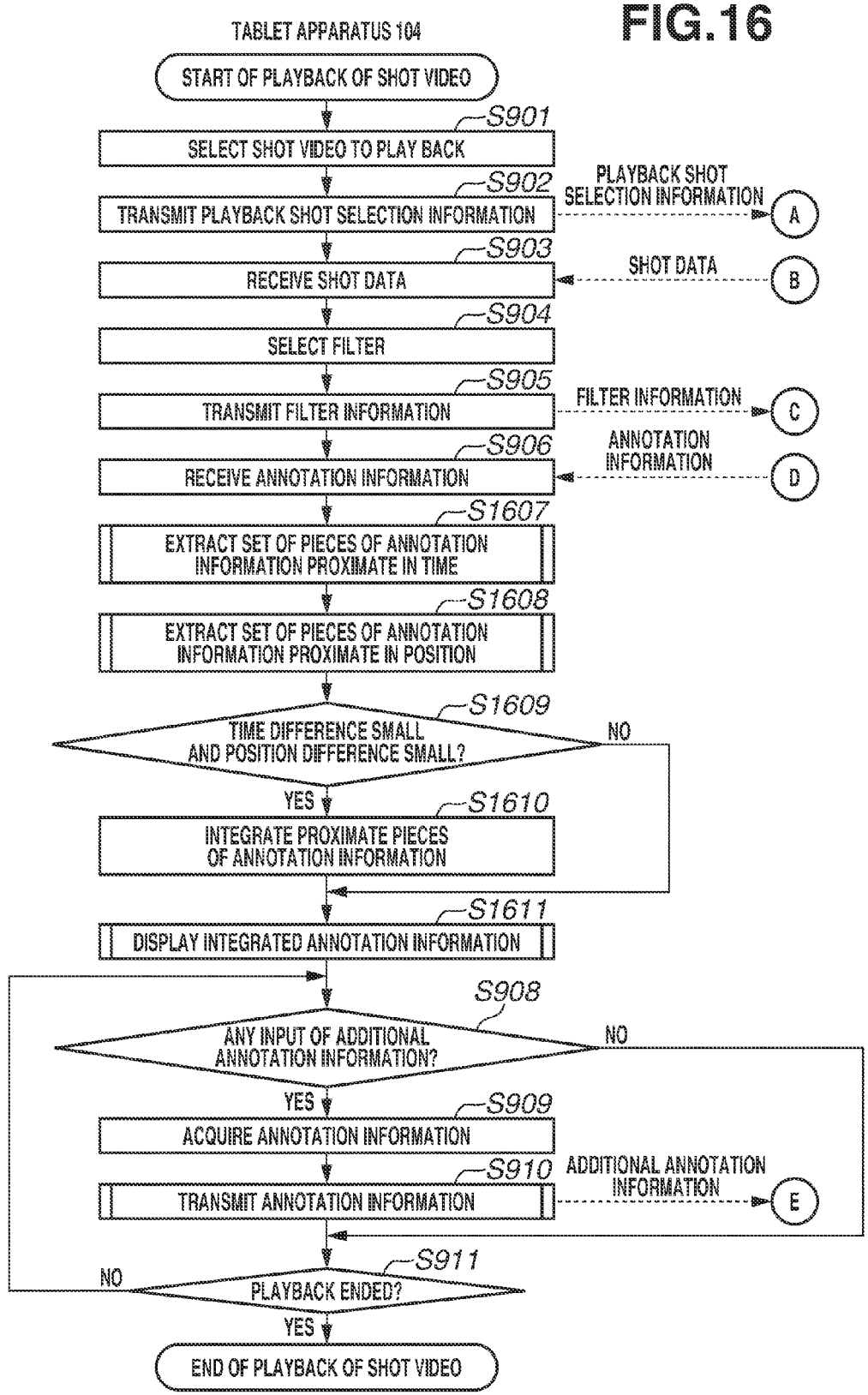

VIDEO PROCESSING APPARATUS, VIDEO PROCESSING METHOD, AND STORAGE MEDIUM

BACKGROUND OF THE INVENTION

Field of the Invention

Aspects of the present invention generally relate to a video processing apparatus, a video processing method, and a storage medium each of which is capable of performing control to display both a video, which is to be processed, and annotation information.

Description of the Related Art

In producing content, such as a movie, each of scene videos constituting video content may be composed of a plurality of shot videos (each being a short-duration video serving as a minimum unit of shooting). Then, in the case of shooting each shot video of a particular scene video, shooting is repetitively performed in similar situations, and shot videos obtained by shooting are compared with one another to select shot videos to be finally used, so that the particular scene video can be generated. In such shooting, since a large number of shot videos are obtained by the shooting operation, appending, to each shot video, annotation information for identifying each shot video can contribute to improving convenience for the user.

Furthermore, Japanese Patent Application Laid-Open No. 9-149307 discusses an electronic camera, which allows inputting of data using a pen-shaped instruction device and is capable of displaying the trajectory of an instruction input by the pen-shaped instruction device in a superimposed manner with a captured image.

In the electronic camera discussed in Japanese Patent Application Laid-Open No. 9-149307, although input information associated with a captured image to play back can be confirmed, making a comparison between the captured image to play back and another captured image using input information associated with such another image is not taken into consideration.

SUMMARY OF THE INVENTION

Aspects of the present invention are generally directed to a video processing apparatus, a video processing method, and a storage medium each of which enables viewing annotation information corresponding to another video associated with a video that is to be played back.

According to an aspect of the present invention, a video processing apparatus includes an acquisition unit configured to acquire annotation information corresponding to at least one associated video, which is associated with a video that is to be processed, and a display control unit configured to perform control to display, on a display screen for displaying the video that is to be processed, both the annotation information corresponding to the associated video acquired by the acquisition unit and the video that is to be processed.

Further features of the present invention will become apparent from the following description of exemplary embodiments with reference to the attached drawings.

BRIEF DESCRIPTION OF THE DRAWINGS

FIG. 1 is a block diagram illustrating a configuration example of a video processing system according to a first exemplary embodiment.

FIGS. 2A and 2B illustrate data structures of video content.

FIGS. 7A, 7B, 7C, and 7D are flowcharts illustrating procedures for appending annotation information to a shot video according to the first exemplary embodiment.

FIGS. 9A and 9B are flowcharts illustrating processing procedures performed by the video processing system according to the first exemplary embodiment.

FIG. 10 illustrates an example of annotation information.

FIG. 11 is a block diagram illustrating a configuration example of a video processing system according to a second exemplary embodiment.

FIGS. 12A and 12B are flowcharts illustrating processing procedures performed by the video processing system according to the second exemplary embodiment.

FIGS. 15A and 15B illustrate displaying of annotation information according to the third exemplary embodiment.

FIG. 16 is a flowchart illustrating processing procedures performed by a tablet apparatus according to the fourth exemplary embodiment.

DESCRIPTION OF THE EMBODIMENTS

Figure 3A:
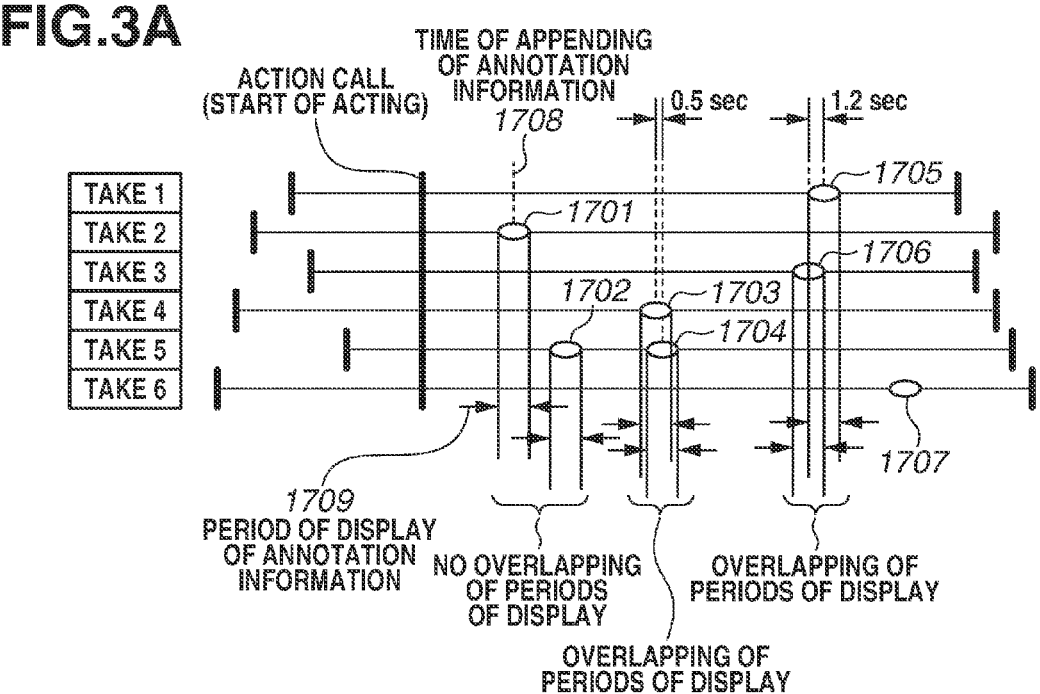
FIGS. 3A, 3B, and 3C illustrate display times and display positions of annotation information according to a fourth exemplary embodiment.

Various exemplary embodiments, features, and aspects of the invention will be described in detail below with reference to the drawings. Furthermore, configurations described in the following exemplary embodiments are merely examples and are not construed to be limited to the illustrated ones. Hereinafter, video data including one or more images is referred to as a "video". Moreover, in the following exemplary embodiments, annotation information is metadata appended to a video (shot video). For example, the annotation information may be comment information or may be information concerning a point of attention.

FIG. 1 illustrates a configuration of a video processing system according to a first exemplary embodiment. The video processing system includes a digital clapboard 101, an imaging apparatus 102, a storage apparatus 103, a tablet apparatus 104, and an editing apparatus 105, which are interconnected by wireless or wired links. In the video processing system according to the present exemplary embodiment, the digital clapboard 101 and the imaging apparatus 102 are interconnected by wireless or wired links and transmit and receive shooting information about video data of a shot that is to be taken. The shooting information is described later below. Furthermore, in the video processing system according to the present exemplary embodiment, the imaging apparatus 102 and the storage apparatus 103 are interconnected by wireless or wired links. Then, the imaging apparatus 102 transmits video data acquired by shooting to the storage apparatus 103, and the storage apparatus 103 stores the video data acquired from the imaging apparatus 102. Moreover, in the video processing system according to the present exemplary embodiment, the tablet apparatus 104 and the storage apparatus 103 are interconnected by wireless or wired links. Then, the tablet apparatus 104 displays video data taken by the imaging apparatus 102 or video data stored by the storage apparatus 103, and the editing apparatus 105 generates video content using the video data stored by the storage apparatus 103.

Next, the details of the apparatuses 101 to 105 are described. The digital clapboard 101 displays shooting information, such as a scene number, a shot number, and a take number, concerning video data of a shot that is to be taken (hereinafter, video data for one shot, serving as a minimum unit of shooting, being referred to as a "shot video"). The video processing system according to the present exemplary embodiment is able to append a visual tag (additional information) to each shot video by acquiring shooting information displayed on the digital clapboard 101 each time a shot video is taken. For example, by taking an image of shooting information displayed on the digital clapboard 101 with the use of the imaging apparatus 102 before shooting of a shot video, the user can append visual additional information to each shot video. Alternatively, the imaging apparatus 102 can acquire shooting information set on an external apparatus (not illustrated), or can acquire shooting information set by the user. Furthermore, the details of a shot video are described later below.

The imaging apparatus 102 captures an image of an object to generate video data. In other words, in the present exemplary embodiment, the imaging apparatus 102 generates a shot video. Furthermore, in the present exemplary embodiment, the imaging apparatus 102 is connected to the digital clapboard 101.

The storage apparatus 103 stores a shot video generated by the imaging apparatus 102 and metadata associated with the shot video (hereinafter, metadata associated with a shot video being referred to as "shot data"). The shot data includes at least one of shooting information, clapboard information, and annotation information. Furthermore, the details of the clapboard information and the annotation information are described later below. Moreover, in the present exemplary embodiment, the storage apparatus 103 communicates with the tablet apparatus 104. The tablet apparatus 104 inputs, to the storage apparatus 103, annotation information specified by the user, as shot data, while a shot video is being taken by the imaging apparatus 102. Furthermore, the tablet apparatus 104 receives a shot video stored in the storage apparatus 103 and displays the received shot video. The editing apparatus 105 performs various types of editing processing operations, such as an operation of joining together shot videos stored in the storage apparatus 103, to generate video content. Furthermore, the details of constituent units of the digital clapboard 101, the imaging apparatus 102, the storage apparatus 103, the tablet apparatus 104, and the editing apparatus 105 are described later below.

Next, the details of video content and a shot video are described with reference to FIG. 2A. FIG. 2A is a diagram illustrating an example of a hierarchical concept of video data for producing video content, which includes one or more shot videos and is used for a digital cinema, drama, or other purpose. Video content produced based on a script or scenario is composed of one or more sequences. On sequence is composed of one or more scenes. Furthermore, one scene is composed of one or more shots. Moreover, in the present exemplary embodiment, the imaging apparatus 102 sets one shot as a single unit of shooting.

For example, in a scene in which a person A and a person B have a conversation, shots with varied shooting positions or angles, such as a long shot in which the two persons are having a conversation, a close up shot of the person B, and a shoulder shot in which the person B is shot over the shoulder of the person A. Shooting of shots or scenes is not always performed in the order defined in a script or scenario (the order of playback of video content), and may be performed in an order different from the order of playback of video content because of preparation of cameras or sets. Furthermore, shooting related to one shot may be re-taken many times due to the mistakes of actors or staff, the intention of a director, an unpredictable natural phenomenon, or other reason. In this way, shooting performed on a single shot is referred to as a "take", and, in a case where the same shot has been taken a plurality of times, a number following "take" is assigned to each shot video for the purpose of identifying each shooting.

More specifically, each shot video can be specified (identified) by appending, as shot data, shooting information, such as numbers of sequence, scene, shot, and take, to each file of shot videos included in video content used for a digital cinema, drama, or other purpose. For example, a video 201 illustrated in FIG. 2A is represented as "sequence 1 scene 1 shot 2 take 4", and a video 202 is represented as "sequence 1 scene 1 shot 4 take 3". Moreover, in a case where there is a plurality of takes with the same shot number, these takes are recognized as replaceable takes by the video processing system. Furthermore, the terms "sequence", "scene", "shot", and "take" as described herein are merely examples used for describing the present exemplary embodiment, and can be replaced by different terms.

Furthermore, FIG. 2B is a diagram illustrating the time-based coincidence (synchronization) of a plurality of takes in the same shot. In many cases, the takes in the same shot have almost the same time length of video because they are obtained by re-taking the same shot. Moreover, the takes in the same shot can be replaced by one another when being edited as video content. However, in the case of actual shooting, the time taken from the start of shooting by the imaging apparatus 102 to the beginning of a video of a portion used for video content may differ with shot videos of the respective takes. In such a case, the timing of an action call (predetermined identification information), which is a command (instruction) given by a director to start acting, can be used as time information indicating the time (clock time) of the start of acting, so that synchronization processing can be performed on a plurality of takes of the same shot. In other words, the video processing system according to the present exemplary embodiment uniforms (synchronizes) the timing of the respective action calls in a plurality of takes of the same shot. Furthermore, the timing of an action call is not limited to the timing of an instruction by a director (user) to start acting, but can be the timing of various instructions by the user. Moreover, in a case where a shot video with no acting, such as a video containing only a landscape, is taken, the timing of a roll call, which indicates the start of shooting, can be used as the timing of an action call. Additionally, the timing of a roll call can be the timing of an instruction by a director (user) to start shooting, or can be the timing of the start of shooting processing performed by the imaging apparatus 102.

In the present exemplary embodiment, the storage apparatus 103 stores the above-mentioned time information as clapboard information on shot data. Furthermore, although, in the present exemplary embodiment, the time information indicates the time of the beginning of a video, this is not limiting. Thus, the time information can indicate a predetermined time serving as a criterion.

In the specific example illustrated in FIG. 2B, the time from a roll call, which indicates the start of shooting, to an action call, which indicates the start of acting, is not uniform between take 1 to take 6. However, since actors start acting in response to an action call, synchronization processing can be performed on the respective takes based on the time information indicating the timing of the action call. Furthermore, the details of the synchronization processing are described later below. Moreover, according to the digitization of clapboards, such an action call can be recorded on the imaging apparatus 102, which is connected to the digital clapboard 101, as a signal (action call signal) used for synchronization processing performed on the respective takes of the same shot. Additionally, the action call signal as used herein is one of pieces of information included in the clapboard information.

Next, referring back to FIG. 1, the details of constituent units of the apparatuses 101 to 105 are described. First of all, the digital clapboard 101 performs control to display, on a display unit 301, shooting information, such as a scene number, a shot number, a take number, and shooting date and time, acquired via wireless communication or wired communication from the imaging apparatus 102. Furthermore, the digital clapboard 101 receives an operation performed by the user on the digital clapboard 101, and transmits (outputs) information on the received operation (clapboard information) to the imaging apparatus 102. For example, when having received the operation for an action call performed by the user, the digital clapboard 101 transmits (outputs), as clapboard information to the imaging apparatus 102, time information indicating the timing of receipt of the action call. In this instance, in the present exemplary embodiment, the digital clapboard 101, which includes a detection unit (not illustrated), receives the operation for an action call based on the detection unit detecting a sound corresponding to the action call (the user's voice or a specific sound). This is not limiting, but the digital clapboard 101 can receive the operation for an action call based on a button (not illustrated) corresponding to the action call being pressed by the user. Moreover, the digital clapboard 101 can output, as clapboard information to the imaging apparatus 102, information indicating the received operation (action call) in addition to time information (time information indicating the timing of an action call).

The imaging apparatus 102 includes a lens 302, a viewfinder 303, an imaging unit 304, a viewfinder display control unit 305, a metadata transmission and reception unit 306, a video data transmission unit 307, and a proxy video generation unit 308. The lens 302, which constitutes an imaging optical system, forms an image on the imaging plane of the imaging unit 304. The imaging unit 304, which is provided for capturing the image of an object, includes a sensor that converts light having passed through the lens and having been focused into electric charge to generate video data. The viewfinder 303 is used for the user to confirm the composition of an object. The viewfinder display control unit 305 performs control to display, on the viewfinder 303, an image (video) captured by the imaging unit 304. Furthermore, the metadata transmission and reception unit 306 transmits, to the outside of the imaging apparatus 102, metadata (shooting data) generated in association with a shooting operation. The shooting data as used herein includes at least one of the above-mentioned shooting information and clapboard information received (input) from the digital clapboard 101.

The proxy video generation unit 308 generates in real time, based on video data generated by the imaging unit 304, a proxy video, which is lower in resolution than the video data. The video data transmission unit 307 combines the video data generated by the imaging unit 304 and data of the proxy video generated by the proxy video generation unit 308 into output data, and transmits the output data to the outside of the imaging apparatus 102.

The storage apparatus 103 includes a metadata reception unit 309, a video data reception unit 310, a proxy video transmission unit 311, a data storage unit 312, an annotation information transmission unit 313, a shot data extraction unit 314, an associated shot detection unit 315, an annotation information extraction unit 316, an annotation information filter unit 317, and a synchronization unit 318. The metadata reception unit 309 receives metadata (shooting data) generated in association with a shooting operation and transmitted from the imaging apparatus 102. The video data reception unit 310 receives output data, including video data, transmitted from the imaging apparatus 102. The proxy video transmission unit 311 separates data of a proxy video from the output data received by the video data reception unit 310, and transmits the separated data of a proxy video to the tablet apparatus 104. The data storage unit 312 stores, as shot data, metadata, such as shooting information or clapboard information, received by the metadata reception unit 309 and annotation information received from the tablet apparatus 104. Furthermore, the data storage unit 312 stores shot data and video data and/or data of a proxy video, which has been received by the video data reception unit 310, while associating them with one another.

The shot data extraction unit 314 extracts shot data corresponding to video data selected via the tablet apparatus 104 from shot data stored in the data storage unit 312. The associated shot detection unit 315 detects whether a shot video associated with the selected video data (an associated shot video) is present in the data storage unit 312 based on the shot data extracted by the shot data extraction unit 314. In short, the associated shot detection unit 315 detects whether shot data of the associated shot video is stored in the data storage unit 312. Here, it is presumed that the shot data associated with the extracted shot data is shot data corresponding to video data of another take with the same shot number as the shot number of the shot data extracted by the shot data extraction unit 314. For example, in a case where video data selected via the tablet apparatus 104 is a video 201 illustrated in FIG. 2A, the shot data extraction unit 314 extracts shot data corresponding the video 201. Then, the associated shot detection unit 315 detects, as shot data of the associated shot video, shot data of five takes, i.e., take 1, take 2, take 3, take 5, and take 6, which have the same shot number (shot 2) as that of the video 201.

Furthermore, although, in the present exemplary embodiment, the associated shot detection unit 315 detects whether shot data of the associated shot video is stored in the data storage unit 312, this is not limiting. For example, the associated shot detection unit 315 can detect whether video data of the associated shot video and/or data of a proxy video is present in the data storage unit 312.

The annotation information filter unit 317 selects (determines) the type of annotation information to extract, based on filter information selected by the user via the tablet apparatus 104. The filter information as used herein is information for selecting annotation information to display. In this way, selecting the type of annotation information to extract enables controlling displaying or non-displaying of the type of each annotation information when comparing video data of a plurality of takes of the same shot. For example, annotation information of the unnecessary type can be made non-displayed or only annotation information of the interested type can be made displayed. The annotation information extraction unit 316 extracts annotation information corresponding to shot data extracted by the shot data extraction unit 314. Furthermore, the annotation information extraction unit 316 extracts one or more pieces of annotation information which correspond to the associated shot video detected by the associated shot detection unit 315 and which has been subjected to filtering by the annotation information filter unit 317.

The synchronization unit 318 adjusts time information belonging to respective pieces of annotation information extracted by the annotation information extraction unit 316 based on the timing (time information) of an action call illustrated in FIG. 2B set as reference time information. For example, the synchronization unit 318 adjusts time information belonging to respective pieces of annotation information extracted by the annotation information extraction unit 316 based on the time information of the action call set as reference time information "00:00". In other words, in the present exemplary embodiment, the synchronization unit 318 uniforms (synchronizes) the respective timings of the action call of the selected shot video and the extracted associated shot video, and adjusts time information of annotation information appended to the associated shot video.

Furthermore, the method for adjusting time information of annotation information is not limited to the method using time information of an action call. More specifically, in the present exemplary embodiment, the synchronization unit 318 adjusts time information of annotation information using time information concerning at least any one of specific sound information, image feature information, shooting setting information, and object position information. For example, the synchronization unit 318 can adjust time information of annotation information using information concerning the time at which specific spoken lines or sound effects have been detected (specific sound information). Furthermore, the synchronization unit 318 can adjust time information of annotation information using information concerning the time at which an image darkening has been detected, the time at which an image lightening has been detected, or the time at which an image changing has been detected (image feature information). Moreover, the synchronization unit 318 can adjust time information of annotation information using shooting information set in the imaging apparatus 102 (shooting setting information). Additionally, the synchronization unit 318 can adjust time information of annotation information using information other than time information of an action call, such as information concerning the position of an object or the position to which an object has moved (object position information). In this way, the synchronization unit 318 is able to adjust time information of annotation information by using time information corresponding to an action call or a specific detected thing and/or position information of an apparatus or an object. The annotation information transmission unit 313 transmits the annotation information adjusted by the synchronization unit 318 to the tablet apparatus 104.

The tablet apparatus 104 includes an annotation output unit 319, a proxy video reception unit 320, a display unit 321, a shot output unit 322, a tablet input unit 323, and an annotation information reception unit 324. The proxy video reception unit 320 receives data of a proxy video transmitted from the imaging apparatus 102 via the storage apparatus 103. The shot output unit 322 performs control to display, on the display unit 321, the data of a proxy video received by the proxy video reception unit 320 as appropriate. Furthermore, the annotation information reception unit 324 receives annotation information stored in the storage apparatus 103. The annotation output unit 319 performs control to display, on the display unit 321, the annotation information received by the annotation information reception unit 324. Then, the display unit 321 displays (plays back) the data of a proxy video and the annotation information according to control performed by the shot output unit 322 and the annotation output unit 319.

Furthermore, although, in the present exemplary embodiment, the tablet apparatus 104 displays, on the display unit 321, data of a proxy video acquired from the imaging apparatus 102 via the storage apparatus 103, this is not limiting. For example, the tablet apparatus 104 can acquire video data (RAW data) stored in the storage apparatus 103 and can display the acquired video data (RAW data) on the display unit 321.

The tablet input unit 323 receives a user operation and acquires information on instructions generated based on the received operation. For example, the tablet input unit 323 is able to detect a touch operation on the display unit 321 performed by the operator (user) of the tablet apparatus 104 and to acquire information on various instructions generated based on the time and/or position at which the display unit 321 has been touched. The information on the time at which the display unit 321 has been touched, as used herein, refers to time information (timing) indicating the time at which a touch operation performed by the user has been detected. The information on the position at which the display unit 321 has been touched, as used herein, refers to coordinate information (position) on the display screen of the display unit 321 at which the touch operation has been detected.

Now, the case where the tablet input unit 323 has acquired annotation information based on the received operation is described. When data of a proxy video corresponding to video data that is being taken by the imaging apparatus 102 is being displayed on the display unit 321, the tablet input unit 323 receives an operation performed by the user to append annotation information to the video data. Then, the tablet input unit 323 acquires, as annotation information, information on the type of an annotation specified by the user and information on the time and/or position at which the display unit 321 has been touched by the user, based on the received operation. Furthermore, the tablet input unit 323 transmits the acquired annotation information to the storage apparatus 103.

Moreover, the tablet input unit 323 selects (determines) a shot video to display (play back) on the display unit 321 from among taken shot videos stored in the storage apparatus 103 based on an operation performed on the display unit 321 by the user. Then, the tablet input unit 323 transmits information on a result of the selection (playback shot selection information) to the storage apparatus 103. Additionally, the tablet input unit 323 determines filter information for selecting annotation information to display on the display unit 321, and transmits the determined filter information to the storage apparatus 103. This processing enables the display unit 321 to display the selected annotation information together with the shot video determined by the tablet input unit 323.

Further, although, in the present exemplary embodiment, the tablet apparatus 104 uses the shot output unit 322 and the annotation output unit 319 as a unit that performs control to display data of a proxy video and annotation information on the display unit 321, this is not limiting. For example, the tablet apparatus 104 can include a display control unit (not illustrated) obtained by integrating the functions of both the shot output unit 322 and the annotation output unit 319. Accordingly, the display control unit (not illustrated) is able to perform control to display, on the display unit 321, annotation information received by the annotation information reception unit 324 as well as data of a proxy video received by the proxy video reception unit 320.

Moreover, although, in the present exemplary embodiment, the display unit 321 receives an operation performed by the user and the tablet input unit 323 acquires information on instructions generated based on an operation performed on the display unit 321 by the user, this is not limiting. For example, the display unit 321 can include the function of the tablet input unit 323.

The editing apparatus 105 includes a storage unit 330 and an editing unit 331. After a shooting operation and an operation for appending annotation information are completed, the storage unit 330 of the editing apparatus 105 copies (duplicates) shot data stored in the data storage unit 312 of the storage apparatus 103, and stores (retains or reserves) a copy of the shot data. Then, the editing unit 331 edits video data based on shot data (video data, metadata appended to video data, and annotation information) stored in the storage unit 330, thus generating video content. In this instance, the editing unit 331 can generate video content based on not only shot data but also a script or scenario data related to predetermined video content.

Figure 4:
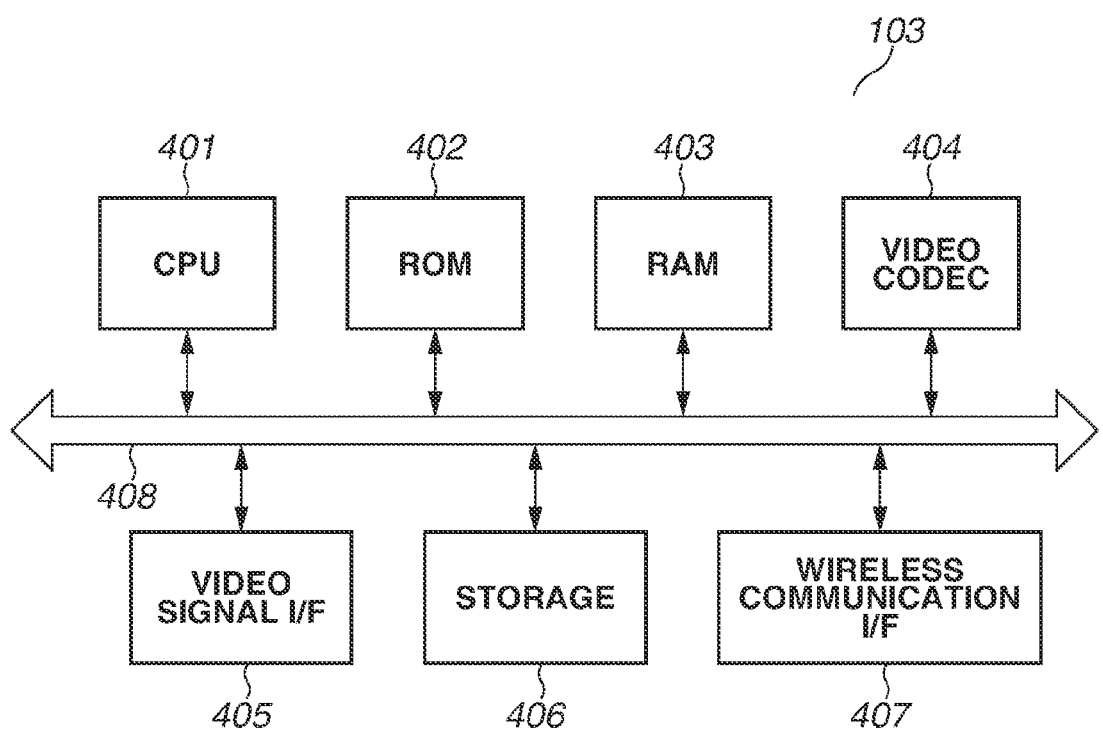
FIG. 4 is a block diagram illustrating a configuration example of a storage apparatus according to the first exemplary embodiment.
Figure 5:
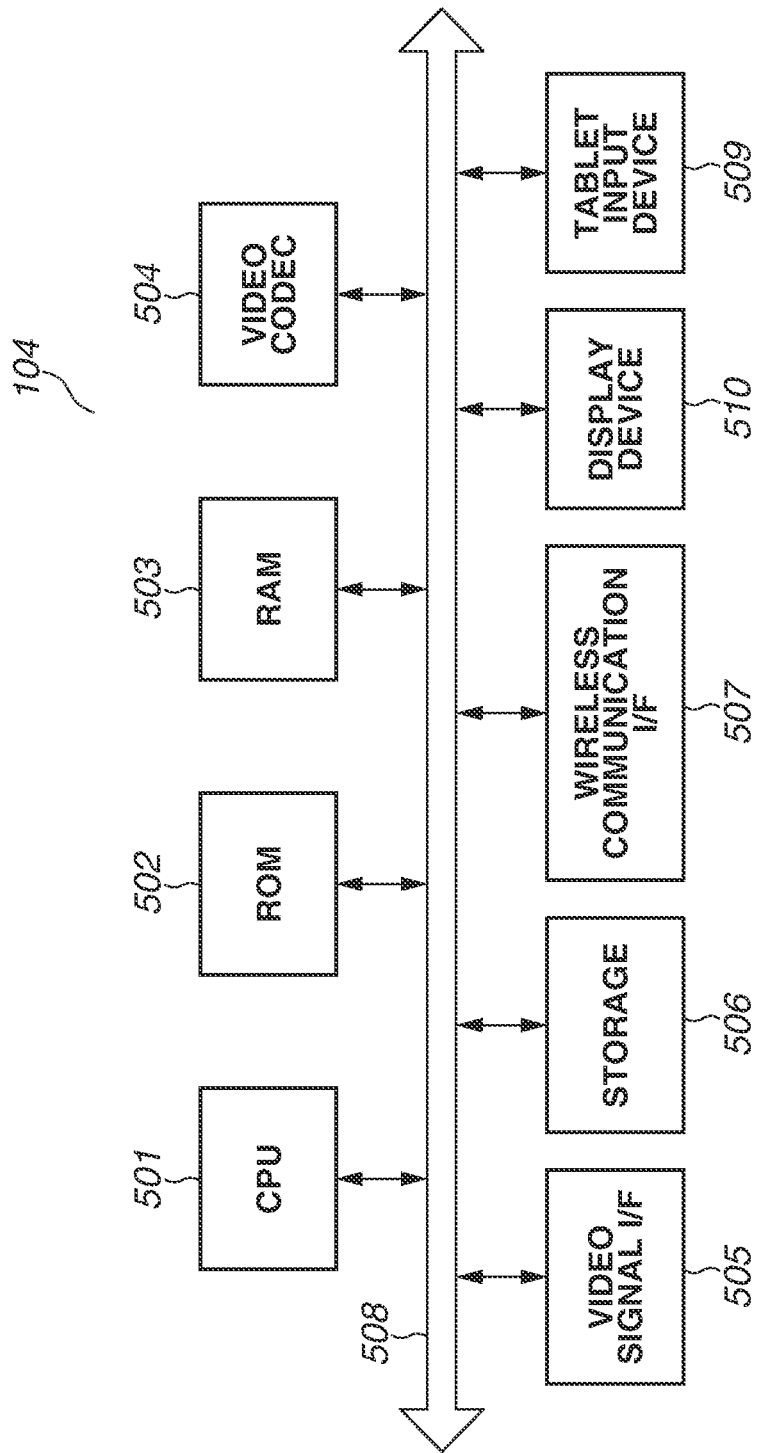
FIG. 5 is a block diagram illustrating a configuration example of a tablet apparatus according to the first exemplary embodiment.

FIGS. 4 and 5 illustrate internal configurations of the storage apparatus 103 and the tablet apparatus 104, respectively, which are principal devices in the present exemplary embodiment. First, the details of various units of the storage apparatus 103 illustrated in FIG. 4 are described. A central processing unit (CPU) 401 performs processing, such as computation or logical determination, performed in the various units 309 to 318 of the storage apparatus 103 illustrated in FIG. 1, and controls various units 402 to 407, which are constituent elements of the storage apparatus 103, connected to a system bus 408. A read-only memory (ROM) 402 stores programs used for control by the CPU 401 and indicating various instructions including processing procedures illustrated in the flowcharts described below. A random access memory (RAM) 403 temporarily stores programs and data loaded from an external storage device (not illustrated), data acquired from the outside via an interface (I/F), and other data. A video codec (coder decoder) 404, which is composed of a media processor for graphic processing and other processors, performs various transcode processing operations on video data. A video signal I/F 405 is an I/F that deals with a video stream signal. A storage 406 stores or caches (temporarily stores) a video signal. A wireless communication I/F 407, which transmits and receives a video stream, retains a predetermined bandwidth and one or more channels.

Next, the details of various units of the tablet apparatus 104 illustrated in FIG. 5 are described. Here, since units 501 to 508 illustrated in FIG. 5 have the respective same functions of the units 401 to 408 illustrated in FIG. 4, the description thereof is omitted. Furthermore, the units 402 to 408 can differ in circuit size from the units 502 to 508. For example, in the present exemplary embodiment, the circuit size of the storage 406 illustrated in FIG. 4 can be larger than the circuit size of the storage 506 illustrated in FIG. 5. The CPU 501 performs processing, such as computation or logical determination, performed in the various units 319 to 324 of the tablet apparatus 104 illustrated in FIG. 1, and controls various units 501 to 507, 509, and 510, which are constituent elements of the tablet apparatus 104, connected to a bus 508. A tablet input device 509 and a display device 510 constitute a user interface (UI) of the tablet apparatus 104. A touch operation performed on the display screen of the display device 510 by the user enables the tablet apparatus 104 to acquire an instruction and information corresponding to the touch operation. For example, when the user performs a pinch-out operation on the display screen of the display device 510, the tablet input device 509 can acquire an enlargement instruction corresponding to the pinch-out operation performed on the display device 510.

Furthermore, the imaging apparatus 102 in the present exemplary embodiment includes a CPU (not illustrated) and a ROM (not illustrated). Then, the CPU (not illustrated) performs processing, such as computation or logical determination, performed in the various units 305 to 308 of the imaging apparatus 102 illustrated in FIG. 1, and the ROM (not illustrated) stores programs indicating various instructions including processing procedures illustrated in the flowcharts described below.

Figure 6A:
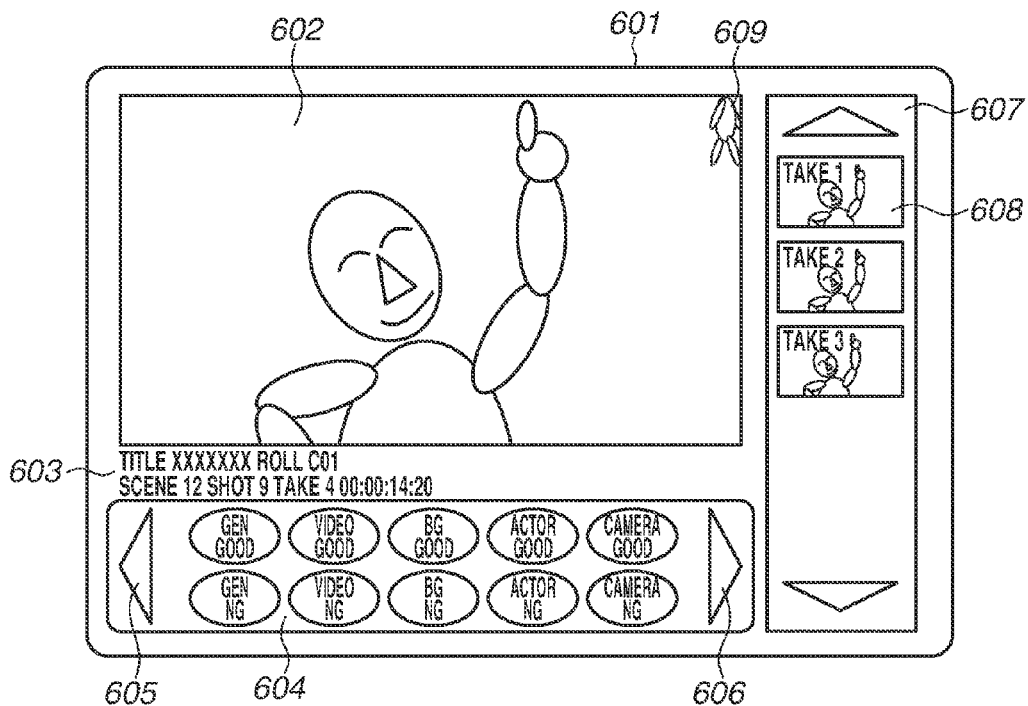
FIGS. 6A, 6B, and 6C illustrate display screens of the tablet apparatus according to the first exemplary embodiment.
Figure 6B:
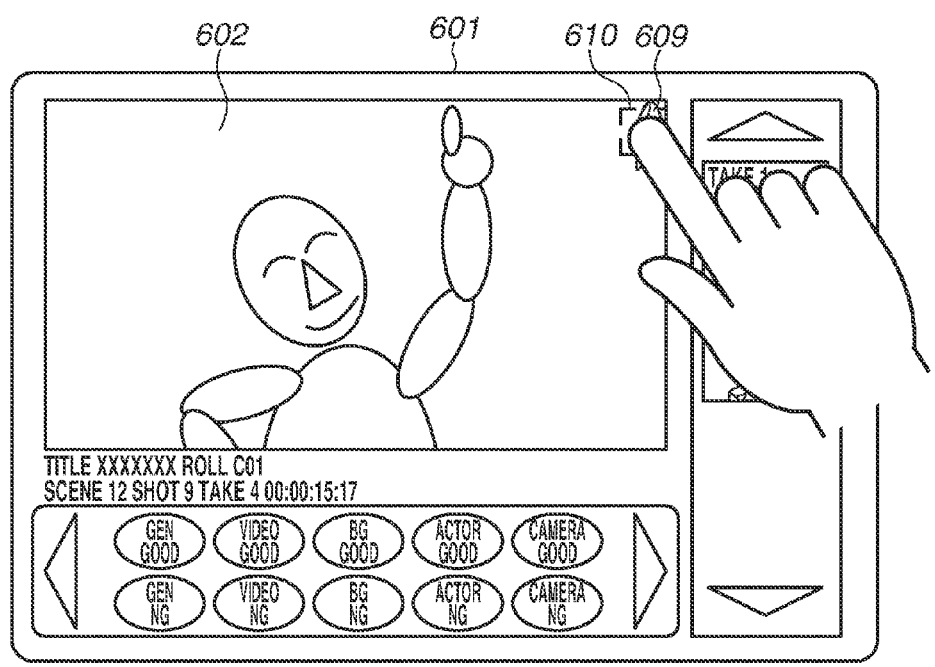
Figure 6C:
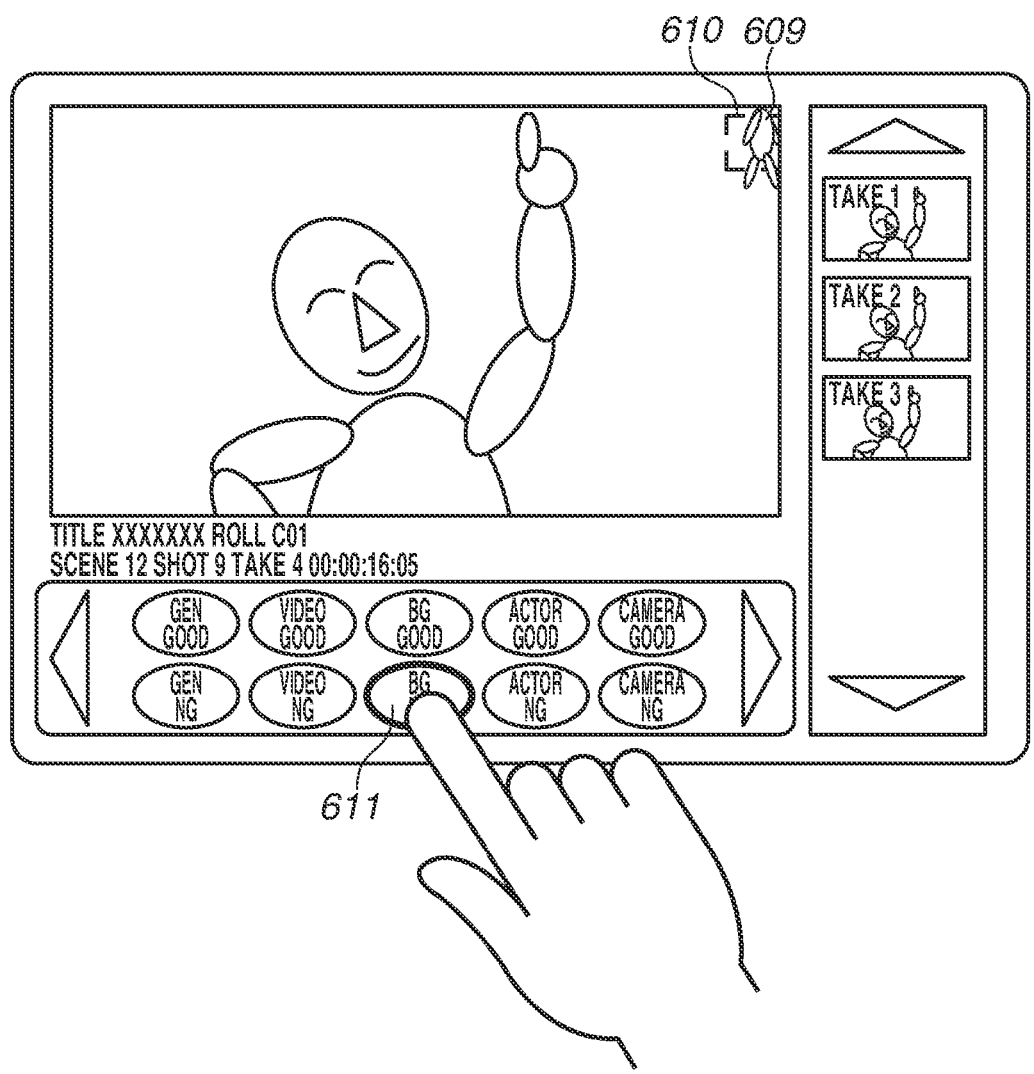

Next, the details of procedures for appending annotation information to a shot video that is being taken according to the present exemplary embodiment are described with reference to FIGS. 6A, 6B, and 6C and FIGS. 7A, 7B, 7C, and 7D. First, FIGS. 6A, 6B, and 6C illustrate display screens (operation screens) on the display unit 321 of the tablet apparatus 104 for implementing the present exemplary embodiment. In the present exemplary embodiment, while shots are taken by the imaging apparatus 102, a shot video that is being taken is played back (displayed) on the tablet apparatus 104. Furthermore, the user, such as a director of photography or staff, can append annotation information in real time by using the tablet apparatus 104 while performing shooting of shots with the imaging apparatus 102.

Referring to FIG. 6A, a display screen 601 is displayed as an operation screen on the display unit 321 of the tablet apparatus 104. A region 602 is used to display in real time a video that is being taken by the imaging apparatus 102 using data of a proxy video. The tablet apparatus 104 is able to detect a touch operation on the region 602 of the display screen 601 performed by the user and to append annotation information corresponding to the time and/or position at which the region 602 has been touched to the displayed data of a proxy video. Furthermore, a display 603 indicates shot data corresponding to a shot video that is being taken, and buttons 604 are shortcut buttons used to specify the type of annotation information. Buttons 605 and 606 are movement buttons used to display shortcut buttons that are not currently displayed on the display screen 601. Moreover, a display 607 is a UI frame used to display a list of thumbnails of shot videos of captured takes associated with a shot that is being taken, in which a display 608 indicates an example of a thumbnail of a captured shot video.

In the present exemplary embodiment, while playing back a proxy video using the tablet apparatus 104, as illustrated in FIG. 6B, the user specifies a position 610 corresponding to the upper right end of the proxy video on the region 602. For example, in a case where the image of staff 609 unexpectedly appears on the background of a proxy video as illustrated in FIG. 6A, the user performs a touch operation to specify the position 610, which corresponds to the image of staff 609, as illustrated in FIG. 6B. The tablet input unit 323 detects the position specified by the user, and acquires time information and/or position information in annotation information based on the detected specified position. The time information in annotation information, as used herein, indicates, when the time of an action call is set as criterion time in a proxy video, time information (timing) from the time of the action call until an instruction for appending annotation information has been detected. Moreover, the position information in annotation information indicates information on a spatial position and coordinate information (position) on an image in the proxy video.

Then, the tablet apparatus 104 performs control to display a cursor mark (hereinafter referred to simply as a "cursor") at the position 610 on the region 602 in the display screen 601 of the display unit 321. Specifically, the cursor displayed at the position 610 is a graphic (image) indicating the position 610. Furthermore, the user selects and specifies, from among the buttons 604, a type 611 of annotation information to append to the position 610, as illustrated in FIG. 6C. For example, in FIG. 6C, the type 611 of annotation information indicating that the background in a proxy video that is being played back is unsuccessful (NG (NO GOOD)) is specified by the user. Then, the tablet input unit 323 acquires information on the type of annotation information specified by the user.

Next, the details of procedures for appending annotation information to a shot video that is being taken are described with reference to FIGS. 7A, 7B, 7C, and 7D. FIGS. 7A, 7B, 7C, and 7D are flowcharts illustrating respective processing operations performed by the imaging apparatus 102, the digital clapboard 101, the storage apparatus 103, and the tablet apparatus 104 when shooting of a shot is performed.

First, processing illustrated in FIG. 7A is described. FIG. 7A is a flowchart illustrating procedures of processing performed by the imaging apparatus 102 when shooting of a shot is performed. The flowchart illustrated in FIG. 7A is implemented by a CPU (not illustrated) of the imaging apparatus 102 executing a control program stored in a ROM (not illustrated) thereof and performing computation and conversion of information and control over each hardware. Furthermore, a part of or all of the steps illustrated in the flowchart of FIG. 7A can be implemented by hardware, such as application specific integrated circuits (ASIC).

First, in step S701, the imaging apparatus 102 acquires shooting information related to a shot video, which is a target for shooting, from the outside of the imaging apparatus 102 or other source, and sets the acquired shooting information. For example, the imaging apparatus 102 can acquire shooting information set by the user. Furthermore, the shooting information indicates information on a unique identifier (ID) such as that illustrated in FIG. 2A, including, for example, a scene number, a shot number, and a take number, related to a shot video, which is a target for shooting. For example, in the case of shooting of a cinema or drama, the order of shots that are to be taken may be determined based on a shooting plan previously prepared in consideration of sets in a shooting studio or schedules of actors. Moreover, in the case of shooting of a cinema or drama, a script or scenario may be previously prepared. Therefore, the imaging apparatus 102 can beforehand set a unique ID to each shot based on the order of shots that are to be taken or the order described in a script or scenario.

In step S702, the imaging apparatus 102 transmits the shooting information set in step S701 to the digital clapboard 101, which is connected to the imaging apparatus 102. In step S703, the imaging unit 304 starts shooting an object to generate video data. Then, in step S704, the proxy video generation unit 308 generates, in real time based on the video data generated by the imaging unit 304, data of a proxy video, which is lower in resolution than the generated video data. In step S705, the metadata transmission and reception unit 306 sequentially acquires the shooting information set by the imaging apparatus 102 as metadata (shooting data) generated in association with shooting. In this instance, the metadata transmission and reception unit 306 can acquire, in addition to shooting information, clapboard information, such as time information indicating the time of the beginning of a video. Furthermore, although, in the present exemplary embodiment, the metadata transmission and reception unit 306 acquires shooting information, this is not limiting. For example, the metadata transmission and reception unit 306 can acquire shooting information and append the shooting information to a proxy video.

In step S706, the video data transmission unit 307 transmits, as output data to the storage apparatus 103, data of a shot video (RAW data) taken by the imaging unit 304 and data of a proxy video generated by the proxy video generation unit 308. In step S707, the metadata transmission and reception unit 306 transmits the metadata acquired in step S705 to the storage apparatus 103. Furthermore, the order of transmission between the output data and the metadata is not limiting. For example, the order between step S706 and step S707 can be reversed.

Next, in step S708, the metadata transmission and reception unit 306 receives clapboard information output from the digital clapboard 101. Then, in step S709, the metadata transmission and reception unit 306 transmits an action call signal to the storage apparatus 103 based on the clapboard information received in step S708. The action call signal as used herein is reference time information used to uniform (synchronize) the time axes of a plurality of takes in the same shot. In step S710, the imaging apparatus 102 determines whether shooting for one shot has been completed. If, in step S710, it is determined that shooting for one shot has not yet been completed (NO in step S710), the imaging apparatus 102 continues shooting of the shot. If it is determined that shooting for one shot has been completed (YES in step S710), the imaging apparatus 102 ends shooting of the shot.

Next, processing illustrated in FIG. 7B is described. FIG. 7B is a flowchart illustrating procedures of processing performed by the digital clapboard 101, which is connected to the imaging apparatus 102, when shooting of a shot is performed by the imaging apparatus 102. The flowchart illustrated in FIG. 7B is implemented by a CPU (not illustrated) of the digital clapboard 101 executing a control program stored in a ROM (not illustrated) thereof and performing computation and conversion of information and control over each hardware. Furthermore, a part of or all of the steps illustrated in the flowchart of FIG. 7B can be implemented by hardware, such as application specific integrated circuits (ASIC).

First, in step S711, the digital clapboard 101 receives shooting information from the imaging apparatus 102. Then, in step S712, the digital clapboard 101 performs control to display the shooting information acquired in step S711 on the display unit 301. Next, after shooting is started, in step S713, the digital clapboard 101 determines whether an operation on the digital clapboard 101 has been performed by the user. If, in step S713, the digital clapboard 101 determines that an operation on the digital clapboard 101 has been performed (YES in step S713), the processing proceeds to step S714. In step S714, the digital clapboard 101 transmits clapboard information associated with the received operation to the imaging apparatus 102. For example, in a case where the digital clapboard 101 has received an operation for an action call performed by the user, the processing proceeds to step S714, in which the digital clapboard 101 transmits an action call signal as clapboard information to the imaging apparatus 102.

Next, processing illustrated in FIG. 7C is described. FIG. 7C is a flowchart illustrating procedures of processing performed by the storage apparatus 103 when shooting of a shot is performed by the imaging apparatus 102. The flowchart illustrated in FIG. 7C is implemented by the CPU 401 of the storage apparatus 103 executing a control program stored in the ROM 402 and performing computation and conversion of information and control over each hardware. Furthermore, a part of or all of the steps illustrated in the flowchart of FIG. 7C can be implemented by hardware, such as application specific integrated circuits (ASIC).

In step S715, the video data reception unit 310 determines whether the reception of output data, which includes video data and data of a proxy video, from the video data transmission unit 307 of the imaging apparatus 102 has been started. If, in step S715, it is determined that the reception of the output data has not yet been started (NO in step S715), the video data reception unit 310 performs processing in step S715 until the reception of the output data is started. If, in step S715, it is determined that the reception of the output data has been started (YES in step S715), then in step S716, the video data reception unit 310 receives the output data. In step S717, the proxy video transmission unit 311 extracts data of a proxy video from the output data input by the video data reception unit 310 in step S716, and transmits the data of a proxy video to the tablet apparatus 104. In step S718, the metadata reception unit 309 inputs metadata from the metadata transmission and reception unit 306 of the imaging apparatus 102. In step S719, the metadata reception unit 309 inputs the action call signal from the metadata transmission and reception unit 306 of the imaging apparatus 102.

Then, in step S720, the data storage unit 312 sequentially stores the output data, the metadata, and the action call signal, which have been input in steps S716, S718, and S719, respectively. In step S721, the data storage unit 312 determines whether annotation information has been input from the tablet apparatus 104. If it is determined that annotation information has been input (YES in step S721), the processing proceeds to step S722. In step S722, the data storage unit 312 receives the annotation information. In step S723, the data storage unit 312 stores the annotation information received by the data storage unit 312 in step S722 while associating the received annotation information with the video data, which is being taken, received by the video data reception unit 310 in step S716. Then, in step S724, the storage apparatus 103 determines whether inputting of video data from the imaging apparatus 102 has ended. The storage apparatus 103 repeats inputting and storing of annotation information until it is determined that inputting of video data has ended.

Next, processing illustrated in FIG. 7D is described. FIG. 7D is a flowchart illustrating procedures of processing performed by the tablet apparatus 104 when shooting of a shot is performed by the imaging apparatus 102. The flowchart illustrated in FIG. 7D is implemented by the CPU 501 of the tablet apparatus 104 executing a control program stored in the ROM 502 and performing computation and conversion of information and control over each hardware. Furthermore, a part of or all of the steps illustrated in the flowchart of FIG. 7D can be implemented by hardware, such as application specific integrated circuits (ASIC).

In step S725, the proxy video reception unit 320 receives data of a proxy video transmitted from the proxy video transmission unit 311 of the storage apparatus 103. Then, in step S726, the tablet apparatus 104 performs control to display the data of a proxy video received by the proxy video reception unit 320 in step S725 on the region 602 of the display screen 601 in the display unit 321 of the tablet apparatus 104. In step S727, the tablet input unit 323 determines whether annotation information has been input to the tablet apparatus 104. Here, the tablet input unit 323 receives a touch operation on the region 602 of the display screen 601 performed by the user, and generates annotation information based on information on the time and/or position at which the region 602 has been touched.

If, in step S727, it is determined that annotation information has been input (YES in step S727), then in step S728, the tablet input unit 323 acquires information on the type of the input annotation information. The information on the type of annotation information is acquired by the tablet input unit 323 detecting a touch operation on one of the buttons 604 (shortcut buttons), illustrated in FIG. 6A, performed by the user before or after a touch operation on the region 602 of the display screen 601 performed by the user. Furthermore, in this instance, in a case where the user has operated the button 605 and the button 606, the tablet input unit 323 can input information on the more detailed type of annotation information or text-based annotation information. In step S729, the tablet input unit 323 transmits the acquired annotation information to the storage apparatus 103. In step S730, the tablet apparatus 104 determines whether data of a proxy video transmitted from the proxy video transmission unit 311 of the storage apparatus 103 has ended. If the tablet apparatus 104 determines that the data of a proxy video has not yet ended (NO in step S730), the processing returns to step S725. If the tablet apparatus 104 determines that the data of a proxy video has ended (YES in step S730), the processing ends.

Here, an example of annotation information, which is input to the tablet input unit 323 of the tablet apparatus 104 and is then stored in the data storage unit 312 of the storage apparatus 103, is described with reference to FIG. 10. FIG. 10 illustrates a mere example of annotation information. As illustrated in FIG. 10, in the present exemplary embodiment, the annotation information includes information about a shot ID, an annotation ID, the start time and end time of annotation information, and the position (X coordinate, Y coordinate, and other positions) on an image to which annotation information is appended. Furthermore, in the present exemplary embodiment, the annotation information also includes information about the type (GOOD or NG (NO GOOD), broad category, and narrow category) of annotation information and comments and the like. "GOOD/NG" is information indicating the appropriateness of a video during generation of video content, in which "GOOD" indicates that the video is appropriate and "NG" indicates that the video is not appropriate. For example, in a case where the image of staff 609 unexpectedly appears on the background as illustrated in FIG. 6C, "GOOD/NG: NG", "broad category: background", and "narrow category: appearance of unexpected object in video" are included in the annotation information.

Furthermore, the shot ID indicates numbers of sequence, scene, shot, and take of a shot video to which annotation information has been appended, based on the hierarchical concept of video data illustrated in FIG. 2A. For example, a shot video indicated with a shot ID of "RC01-S12-S07-T5" indicates a video with sequence number 01, scene number 12, shot number 07, and take number 5. Furthermore, the annotation ID is an identifier (code) for identifying each piece of annotation information appended to a shot video.

The start time indicates information on the time at which appending of annotation information to a shot video has started. Moreover, the end time indicates information on the time at which appending of annotation information to a shot video has ended. Additionally, in the present exemplary embodiment, the start time and the end time are determined based on the timing of an action call and indicate information on the time at which appending of annotation information has started from the timing of the action call and the time at which appending of the annotation information has ended. Furthermore, the position on an image to which annotation information has been appended indicates a position (coordinates) on the region 602 of the display screen 601 illustrated in FIG. 6A.

Moreover, although, in the present exemplary embodiment, the annotation information includes information illustrated in FIG. 10, this is not limiting. For example, as long as the annotation information includes at least time information and/or position information related to appending of the annotation information, the annotation information can additionally include information other than the information illustrated in FIG. 10.

As described in the foregoing, performing the operations described with reference to FIGS. 6A, 6B, and 6c and FIGS. 7A, 7B, 7C, and 7D enable appending annotation information to a shot video that is being taken.

Figure 8A:
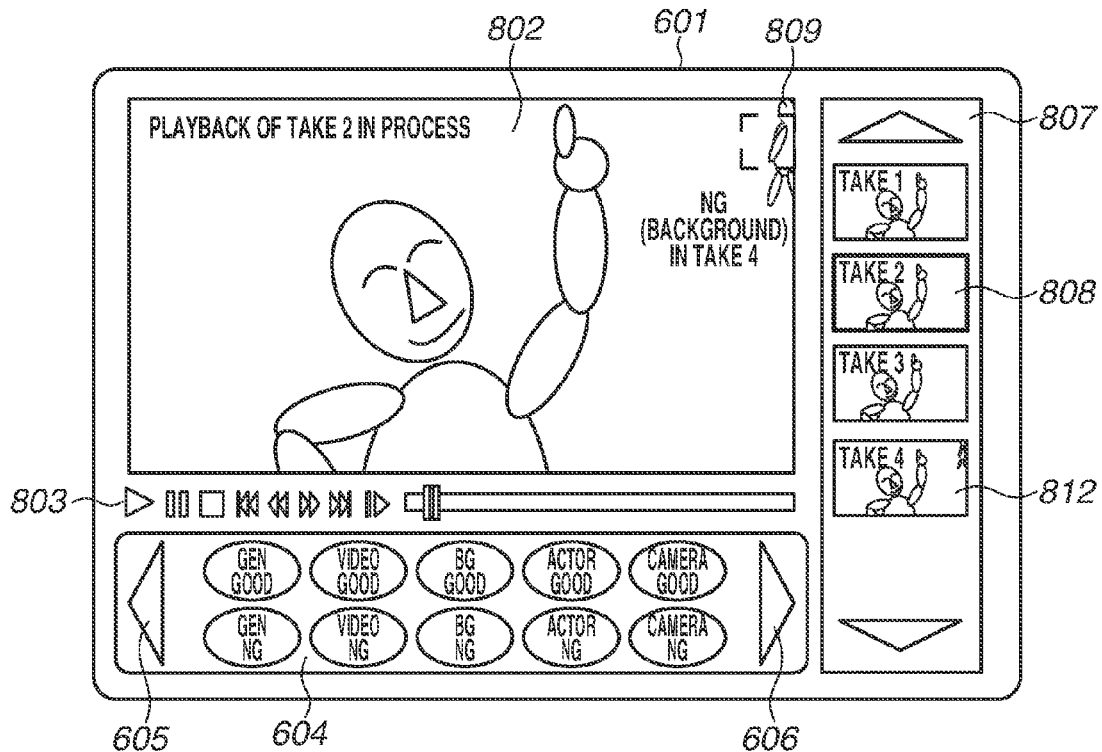
FIGS. 8A, 8B, and 8C illustrate display screens for displaying annotation information according to the first exemplary embodiment.
Figure 8B:
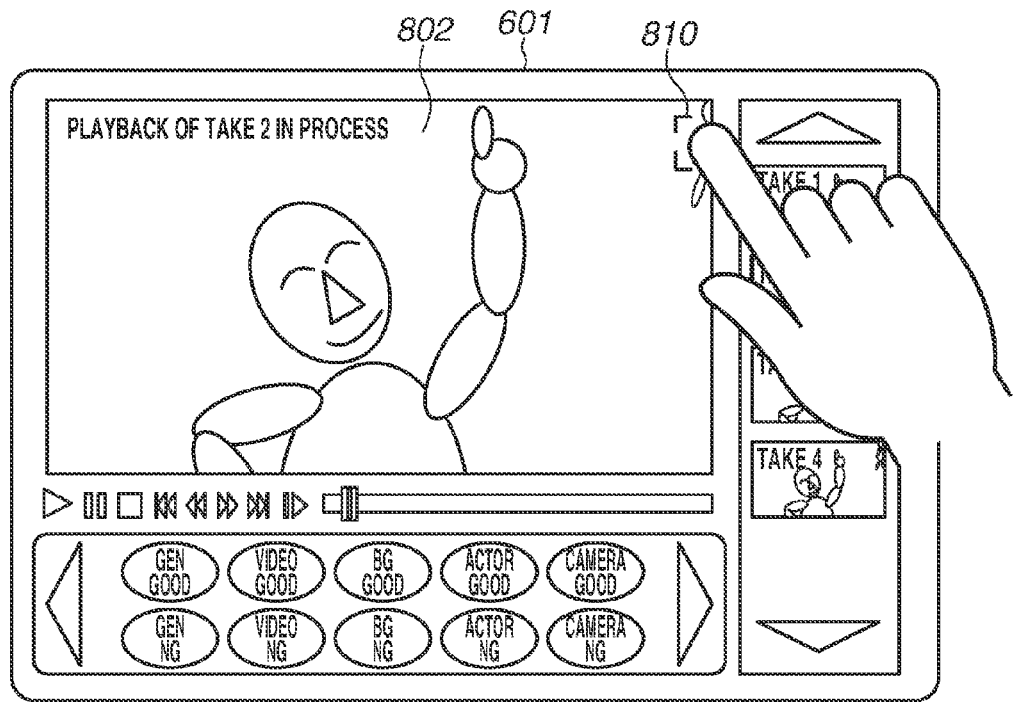
Figure 8C:
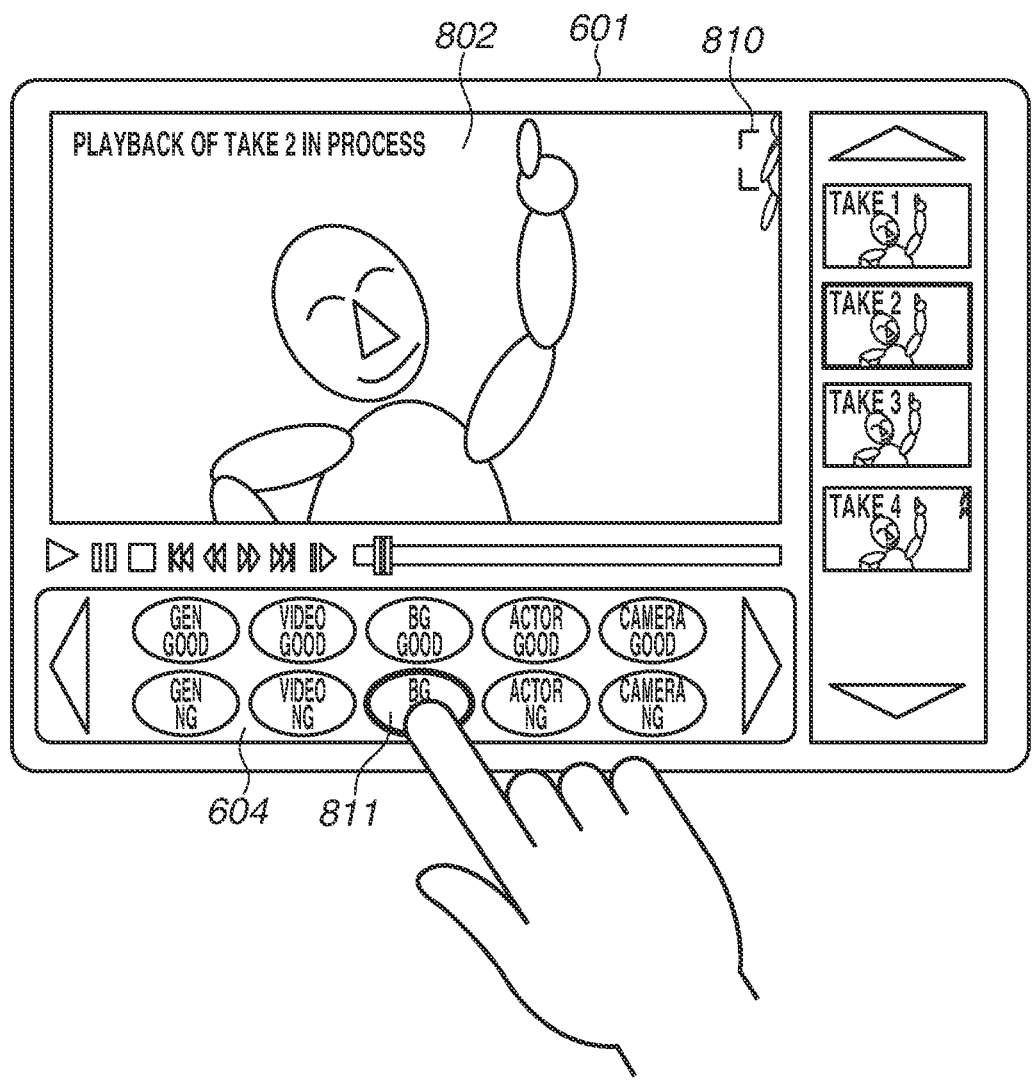

Next, the details of processing for playing back a taken shot video according to the present exemplary embodiment are described with reference to FIGS. 8A, 8B, and 8C and FIGS. 9A and 9B. FIGS. 8A, 8B, and 8C illustrate display screens displayed on the display unit 321 of the tablet apparatus 104 when a taken shot video is played back. For example, the tablet apparatus 104 according to the present exemplary embodiment provides displays as illustrated in FIGS. 8A, 8B, and 8C about four types of takes taken with respect to the same shot, thus enabling comparing shot videos of the respective takes with one another. Furthermore, in FIGS. 8A, 8B, and 8C, components having the respective same functions as those of the components illustrated in FIGS. 6A, 6B, and 6C are assigned the respective same reference numerals, and the description thereof is not repeated.

Referring to FIG. 8A, a display 807 is a thumbnail frame indicating a list of takes associated with a shot taken by the imaging apparatus 102. A shot video 808, which is enclosed with a thick frame in FIG. 8A, is a shot video selected as a target for playback by the user from among takes associated with the taken shot. A region 802 is used to display the selected shot video 808 using data of a proxy video thereof. The tablet apparatus 104 detects a touch operation on the region 802 of the display screen 601 performed by the user. Then, the tablet apparatus 104 is able to append, to the data of the displayed proxy video, annotation information corresponding to the time and/or position at which the region 802 has been touched. In other words, while, in the case of FIG. 6A, annotation information is appended to a shot video that is being taken, in the case of FIG. 8A, annotation information is appended to a taken shot video that is being played back. A button 803 is used as a tool button for playback control. For example, the button 803 can be used to specify playback, pause, stop, skip forward, rewind, fast forward, skip backward, and slow playback with respect to video data to be displayed, and to specify a playback portion using a seek bar (playback bar).

Furthermore, as illustrated in FIG. 8A, not only the selected shot video 808 but also annotation information 809 appended to a shot video associated with the selected shot video 808 (an associated shot video) is displayed on the region 802. In other words, both the selected shot video 808 and the annotation information 809, which is appended to an associated shot video 812 that is a shot video of another take of the same shot as that of the selected shot video 808, are displayed on the region 802. In this way, annotation information "NG (background) in take 4" appended to an associated shot video is displayed (superimposed) as text information together with a selected shot video. Such a superimposed display enables the user to confirm, as a point of attention, the time and position indicated by annotation information appended to an associated shot video.

Moreover, in a case where, as illustrated in FIG. 8B, when a taken shot video is being played back, the user has specified a position 810 corresponding to the upper right end of the shot video, the tablet input unit 323 of the tablet apparatus 104 detects the position 810 specified by the user. Then, the tablet input unit 323 acquires time information and/or position information of annotation information based on the detected specified position. Then, the tablet apparatus 104 performs control to display a cursor at the position 810 on the region 802 in the display screen 601 of the display unit 321. Additionally, the user selects and specifies a type 811 of annotation information to append to the position 810 from among the buttons 604, as illustrated in FIG. 8C. For example, in the case of FIG. 8C, the type 811 of annotation information indicating that the background of a proxy video that is being played back is NG (unsuccessful) is specified. Then, the tablet input unit 323 acquires information on the type of annotation information specified by the user. In this way, the tablet apparatus 104 is able to append annotation information when a taken shot video is being played back.

Next, the details of procedures for playing back a taken shot video are described with reference to FIGS. 9A and 9B. FIGS. 9A and 9B are flowcharts illustrating respective processing operations performed by the tablet apparatus 104 and the storage apparatus 103 when a shot video is played back.

First, processing illustrated in FIG. 9A is described. FIG. 9A is a flowchart illustrating procedures of processing performed by the tablet apparatus 104 when a shot video is played back. The flowchart illustrated in FIG. 9A is implemented by the CPU 501 of the tablet apparatus 104 executing a control program stored in the ROM 502 and performing computation and conversion of information and control over each hardware. Furthermore, a part of or all of the steps illustrated in the flowchart of FIG. 9A can be implemented by hardware, such as application specific integrated circuits (ASIC).

First, in step S901, the tablet input unit 323 of the tablet apparatus 104 selects (determines) a shot video to play back, based on an instruction from the user. For example, the tablet input unit 323 receives an instruction from the user for playing back a shot video with a shot ID of "RC01-S12-S09-T2" (1001 in FIG. 10), and selects a shot video associated with the shot ID as a shot video to play back. Here, as illustrated in FIG. 10, with respect to the shot number S09 corresponding to the selected shot video 1001, there are five shot videos with take numbers T1 to T5 (T1, T2, T3, T4, and T5). In such a case, during shooting, it is necessary to confirm whether there is a shot video with no shooting mistake from among the five shot videos. Moreover, during production of video content, it is necessary to select a shot video with no shooting mistake from among the five shot videos.

In step S902, the tablet input unit 323 transmits information on a result of the selection made in step S901 (playback shot selection information) to the storage apparatus 103. Then, in step S903, the proxy video reception unit 320 receives shot data (video data) associated with the shot video selected in step S901, from among shot data stored in the storage apparatus 103. In step S904, the tablet input unit 323 selects, based on the user operation, the type of annotation information to concurrently display during playback of the shot video, and determines filter information based on the selected type of annotation information. Here, in the present exemplary embodiment, the tablet input unit 323 acquires, as the type of annotation information, a tag of "GOOD/NG", such as information 1002 illustrated in FIG. 10, or a tag of a specific "category", such as "broad category" of information 1003 and "narrow category" of information 1004 illustrated in FIG. 10. Then, the tablet input unit 323 is able to select filter information matched with the purpose of comparison based on the type of annotation information. For example, the tablet input unit 323 can select filter information for displaying only annotation information appended to a shot video to play back. Furthermore, the tablet input unit 323 can select filter information for also concurrently displaying annotation information appended to a shot video associated with a shot video to play back.

In step S905, the tablet apparatus 104 transmits the filter information selected by the tablet input unit 323 in step S904 to the storage apparatus 103. The storage apparatus 103 performs filtering on the annotation information acquired from the tablet apparatus 104 based on the filter information acquired from the tablet apparatus 104. The details of this processing performed by the storage apparatus 103 are described later below. Then, in step S906, the annotation information reception unit 324 receives the annotation information subjected to filtering by the storage apparatus 103. Then, in step S907, the annotation output unit 319 and the shot output unit 322 perform control to display, on the display unit 321, data of a proxy video received in step S903 and annotation information received in step S906. With the above processing performed, the display unit 321 displays, on the region 802, a selected shot video and the annotation information 809 superimposed on (corresponding to) the selected shot video, as illustrated in FIG. 8A.

Furthermore, a case is described where, when data of a proxy video corresponding to the selected shot video and annotation information are being displayed, the user has performed a touch operation on the region 802 in the display screen 601 of the display unit 321. In this case, the tablet input unit 323 is able to detect a touch operation on the position 810, illustrated in FIG. 8B, performed by the user and to append annotation information to a shot video that is being displayed, based on a result of the detection of the position 810. For this reason, in step S908, the tablet input unit 323 determines whether annotation information has been added. If, in step S908, it is determined that annotation information has been added (YES in step S908), then in step S9090, the tablet input unit 323 acquires annotation information based on a touch operation performed by the user illustrated in FIG. 8C. Then, in step S910, the tablet input unit 323 transmits the annotation information acquired in step S909 to the storage apparatus 103. In step S911, the tablet apparatus 104 determines whether playback of video data for one shot has been completed. If, in step S911, the tablet apparatus 104 determines that playback of video data for one shot has not yet been completed (NO in step S911), the processing returns to step S908. If the tablet apparatus 104 determines that playback of video data for one shot has been completed (YES in step S911), the tablet apparatus 104 ends playback of a shot and addition of annotation information. In other words, the tablet apparatus 104 is able to add annotation information until the tablet apparatus 104 determines that playback of video data for one shot has been completed.

Next, processing illustrated in FIG. 9B is described. FIG. 9B is a flowchart illustrating procedures of processing performed by the storage apparatus 103 when a shot video is played back. The flowchart illustrated in FIG. 9B is implemented by the CPU 401 of the storage apparatus 103 executing a control program stored in the ROM 402 and performing computation and conversion of information and control over each hardware. Furthermore, a part of or all of the steps illustrated in the flowchart of FIG. 9B can be implemented by hardware, such as application specific integrated circuits (ASIC).

First, in step S912, the shot data extraction unit 314 receives the playback shot selection information output from the tablet input unit 323 of the tablet apparatus 104. Then, in step S913, the shot data extraction unit 314 extracts shot data corresponding to the playback shot selection information received in step S912. In step S914, the proxy video transmission unit 311 transmits, to the tablet apparatus 104, the shot data extracted by the shot data extraction unit 314 in step S913. Then, in step S915, the associated shot detection unit 315 detects an associated shot video that is associated with the shot data extracted by the shot data extraction unit 314 in step S913.

In step S916, the associated shot detection unit 315 determines whether the associated shot video has been detected in step S915. If the associated shot detection unit 315 determines that the associated shot video has been detected (YES in step S916), the processing proceeds to step S917. On the other hand, if the associated shot detection unit 315 determines that the associated shot video has not been detected (NO in step S916), the processing proceeds to step S918. In step S917, the annotation information extraction unit 316 acquires, from the data storage unit 312, annotation information corresponding to the associated shot video detected by the associated shot detection unit 315. In step S918, the annotation information filter unit 317 receives the filter information output from the tablet input unit 323 of the tablet apparatus 104. Then, in step S919, the annotation information filter unit 317 performs filter processing on the annotation information corresponding to the associated shot video, acquired by the annotation information extraction unit 316 in step S917, based on the received filter information. In other words, in step S919, the annotation information filter unit 317 selects the type of annotation information to extract, based on the filter information.

Then, in step S920, the synchronization unit 318 adjusts time information of annotation information of associated shot videos based on the timing (time information) of an action call, as illustrated in FIG. 2B. Then, in step S921, the annotation information transmission information 313 transmits the annotation information selected in step S919 and adjusted in step S920 to the tablet apparatus 104. Furthermore, while playback of a shot is being performed by the tablet apparatus 104, additional annotation information may be appended. Therefore, in step S922, the storage apparatus 103 determines whether there is additional annotation information to append. If the storage apparatus 103 determines that there is additional annotation information to append (YES in step S922), the processing proceeds to step S923. If the storage apparatus 103 determines that there is no additional annotation information to append (NO in step S922), the processing proceeds to step S925. In step S923, the data storage unit 312 receives the additional annotation information, and, in step S924, the data storage unit 312 stores the additional annotation information while associating the additional annotation information with a shot video that is being played back. Then, in step S925, the storage apparatus 103 determines whether playback of video data for one shot has been completed. If the storage apparatus 103 determines that the playback has not yet been completed (NO in step S925), the processing returns to step S922. If the storage apparatus 103 determines that the playback has been completed (YES in step S925), the storage apparatus 103 ends storage processing for annotation information.

As mentioned above, the video processing system according to the present exemplary embodiment performs processing illustrated in FIGS. 8A, 8B, and 8C and FIGS. 9A and 9b. With this processing performed, the video processing system according to the present exemplary embodiment concurrently displays both a shot video that is being played back and annotation information appended to a shot video associated with the first-mentioned shot video. Accordingly, the video processing system according to the present exemplary embodiment facilitates the user to view and confirm annotation information appended to the associated shot video. Furthermore, the video processing system according to the present exemplary embodiment additionally appends, to a shot video that is being played back, annotation information regarding a newly found point.

As described above, the video processing system according to the present exemplary embodiment is able to display both a video (a specific shot video) and annotation information appended to another video associated with the specific shot video (an associated shot video). In other words, the video processing system according to the present exemplary embodiment is able to display, when playing back a specific shot video, annotation information appended to an associated shot video that is replaceable with the specific shot video. Then, even during playback of a specific shot video, the video processing system enables the user to determine whether to use the specific shot video for video content in consideration of annotation information of an associated shot video.

Furthermore, the video processing system according to the present exemplary embodiment displays, when playing back a specific shot video, a portion of attention, which is indicated by annotation information appended to a shot video (an associated shot video) of another take associated with the specific shot video, and a content of the appended annotation information. With this display, in a case where there are shot videos of a plurality of takes in the same shot, the user can view and confirm a point of attention in the specific shot video, and can more easily select a shot video used to generate video content than ever before.

Moreover, the video processing system according to the present exemplary embodiment is able to easily append annotation information using a tablet apparatus during shooting of shot videos of a plurality of takes in the same shot.

The above-described first exemplary embodiment is configured to display annotation information appended to a shot video on the display unit 321 of the tablet apparatus 104 during playback of a shot video associated with the first-mentioned shot video. On the other hand, a second exemplary embodiment is configured to display annotation information appended to a shot video on the display unit 321 of the tablet apparatus 104 during shooting of a shot video of another take in the same shot as that of the first-mentioned shot video.

FIG. 11 illustrates a configuration of a video processing system according to the second exemplary embodiment. Furthermore, in FIG. 11 according to the second exemplary embodiment, the apparatuses and units having the respective same functions as those of the apparatuses and units illustrated in FIG. 1 of the first exemplary embodiment are assigned the respective same reference numerals, and the description thereof is, therefore, not repeated. The imaging apparatus 102 in the second exemplary embodiment differs from the imaging apparatus 102 illustrated in FIG. 1 of the first exemplary embodiment in that the imaging apparatus 102 further includes an annotation information superimposition unit 1101. The annotation information superimposition unit 1101 superimposes, on an image (video) taken by the imaging apparatus 102, annotation information transmitted from the storage apparatus 103 and appended to a shot video associated with a shot video that is being taken. Then, the viewfinder display control unit 305 performs control to display both the annotation information superimposed by the annotation information superimposition unit 1101 and the taken shot video on the viewfinder 303.

Furthermore, the storage apparatus 103 in the second exemplary embodiment differs from the storage apparatus 103 illustrated in FIG. 1 of the first exemplary embodiment in that the annotation information transmission unit 313 transmits annotation information to the imaging apparatus 102. In the second exemplary embodiment, the annotation information transmission unit 313 acquires annotation information, stored in the data storage unit 312, of a shot video associated with a shot video that is being taken, based on metadata output from the metadata transmission and reception unit 306 of the imaging apparatus 102. Then, the annotation information transmission unit 313 transmits the acquired annotation information to the imaging apparatus 102.

Figure 12A:
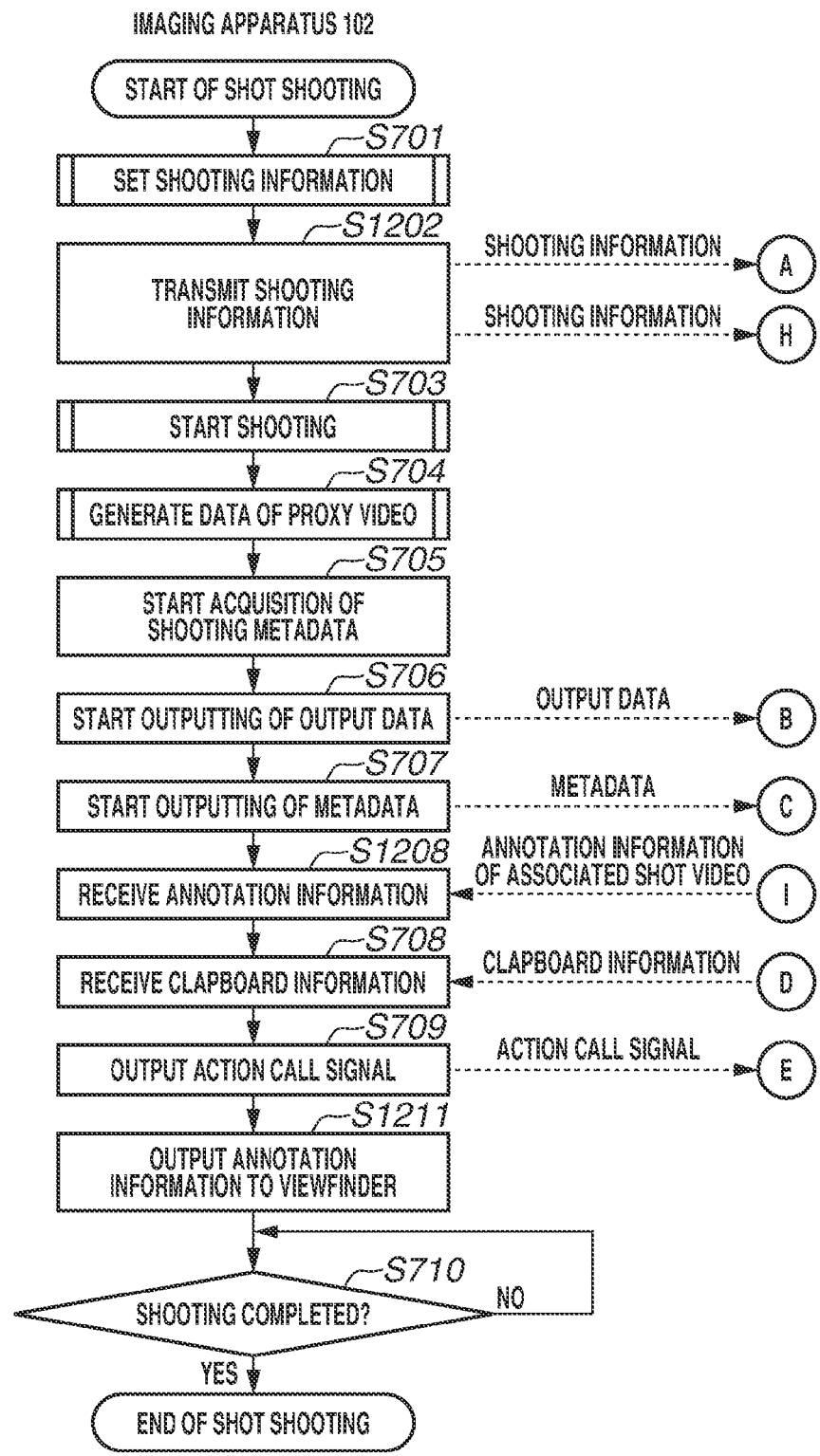

Next, the details of procedures performed when shooting of a shot is performed in the second exemplary embodiment are described with reference to FIGS. 12A and 12B and FIG. 13. FIGS. 12A and 12B are flowcharts illustrating processing performed by the imaging apparatus 102 and the storage apparatus 103, respectively, when shooting of a shot is performed. Furthermore, in FIGS. 12A and 12B, steps for performing respective equivalent processing operations to those in the steps illustrated in FIGS. 7A and 7C of the first exemplary embodiment are assigned the respective same step numbers, and the description thereof is, therefore, not repeated. Furthermore, in the second exemplary embodiment, respective processing operations performed by the digital clapboard 101 and the tablet apparatus 104 when shooting of a shot is performed are equivalent to those illustrated in FIGS. 7B and 7D of the first exemplary embodiment, and the description thereof is, therefore, not repeated.

First, processing illustrated in FIG. 12A is described. FIG. 12A is a flowchart illustrating procedures of processing performed by the imaging apparatus 102 when shooting of a shot is performed. The flowchart illustrated in FIG. 12A is implemented by a CPU (not illustrated) of the imaging apparatus 102 executing a control program stored in a ROM (not illustrated) thereof and performing computation and conversion of information and control over each hardware. Furthermore, a part of or all of the steps illustrated in the flowchart of FIG. 12A can be implemented by hardware, such as application specific integrated circuits (ASIC).

In step S1202, the metadata transmission and reception unit 306 transmits shooting information set in step S701 to the digital clapboard 101 and the storage apparatus 103, which are connected to the imaging apparatus 102. Furthermore, in step S1208, the annotation information superimposition unit 1101 receives, from the storage apparatus 103, annotation information appended to a shot video associated with a shot video that is being taken. Moreover, in step S1211, the annotation information superimposition unit 1101 performs control to superimpose the annotation information received in step S1208 on a video taken by the imaging unit 304, which is displayed on the viewfinder 303. Subsequently, the imaging apparatus 102 continues shooting of a shot until it is determined in step S710 that shooting of a video for one shot has been completed, in the same way as that illustrated in FIG. 7A of the first exemplary embodiment.

Next, processing illustrated in FIG. 12B is described. FIG. 12B is a flowchart illustrating procedures of processing performed by the storage apparatus 103 when shooting of a further take is performed in a specific shot already taken. The flowchart illustrated in FIG. 12B is implemented by the CPU 401 of the storage apparatus 103 executing a control program stored in the ROM 402 and performing computation and conversion of information and control over each hardware. Furthermore, a part of or all of the steps illustrated in the flowchart of FIG. 12B can be implemented by hardware, such as application specific integrated circuits (ASIC).

In step S1217, the metadata reception unit 309 receives, from the imaging apparatus 102, metadata of a shot video that is taken by the imaging apparatus 102. Then, in step S1218, the associated shot detection unit 315 detects shot data of an associated shot video, which is associated with a shot video that is being taken, from among shot data stored in the data storage unit 312 based on the metadata acquired in step S1217. Here, the shot data of an associated shot video refers to video data of another shot video, which is video data already stored in the storage apparatus 103, having the same shot number as that of the shot video that is being taken acquired in step S1217. In step S1219, the associated shot detection unit 315 determines whether there is an associated shot video that is associated with a shot video that is being taken. If the associated shot detection unit 315 determines that there is such an associated shot video (YES in step S1219), the processing proceeds to step S1220. If the associated shot detection unit 315 determines that there is no such associated shot video (NO in step S1219), the processing proceeds to step S715.

In step S1220, the annotation information transmission unit 313 acquires annotation information corresponding to the associated shot video detected in step S1218. In step S1221, the synchronization unit 318 adjusts time information of annotation information appended to the associated shot video based on the timing (time information) of an action call, as in the processing in step S920 illustrated in FIG. 9B of the first exemplary embodiment. In other words, in the second exemplary embodiment, the synchronization unit 318 uniforms (synchronizes) the timing of respective action calls of a shot video that is being taken and an associated shot video as reference time information 00:00, and adjusts time information of annotation information appended to the associated shot video. Then, in step S1222, the annotation information transmission unit 313 transmits the annotation information of the associated shot video, the time information of which has been adjusted in step S1221, to the imaging apparatus 102.

Figure 13:
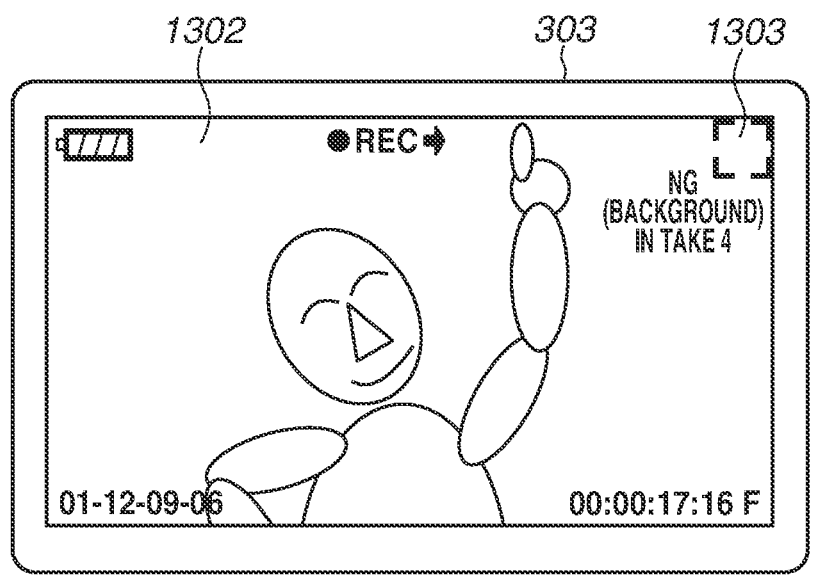
FIG. 13 illustrates a viewfinder screen of an imaging apparatus according to the second exemplary embodiment.

Next, a display screen illustrated in FIG. 13 is described. FIG. 13 illustrates a display screen (viewfinder screen) on the viewfinder 303 in a case where annotation information appended to an associated shot video, which is associated with a shot video that is being taken, is displayed while being superimposed on a video taken by the imaging unit 304. As illustrated in FIG. 13, in the viewfinder screen 1302 on the viewfinder 303, annotation information 1303 appended to an associated shot video is displayed while being superimposed on a shot video that is being taken. In this way, annotation information "NG (background) in take 4" appended to an associated shot video is displayed (superimposed) together as text information. This superimposed display enables the user to confirm, as a point of attention, time information and position information of annotation information appended to an associated shot video.

As described above, performing operations illustrated in FIGS. 12A and 12B and FIG. 13 enables displaying annotation information appended to an associated shot video, which is associated with a shot video that is being taken, on the viewfinder 303

As described above, the video processing system according to the second exemplary embodiment can display both a video (a specific shot video) and annotation information appended to another video (an associated shot video) that is associated with the specific shot video. In other words, the video processing system according to the second exemplary embodiment is able to display, when retaking a shot video in a specific situation, annotation information appended to an associated shot video already taken in the specific situation.

Furthermore, the video processing system according to the second exemplary embodiment displays, when taking a specific shot video, a point of attention and a content thereof indicated by annotation information appended to a shot video (an associated shot video) of another take associated with the specific shot video. This display allows the user when taking (retaking) a shot video of a new take in the same shot to view and confirm a point of attention in the shot video, thus reducing the possibility of the same shooting mistake as that in the already-taken associated shot video being made. Furthermore, such a display allows the user to retake a shot video while confirming annotation information (a point of attention) appended to the already-taken associated shot video, so that convenience for the user can be improved.

Moreover, although, in step S1221 illustrated in FIG. 12B of the second exemplary embodiment, the synchronization unit 318 sets the timing of display of annotation information to superimpose on a shot video that is being taken to the same timing as that of annotation information appended to an associated shot video, this is not limiting. In other words, in step S1221, the synchronization unit 318 can set a predetermined offset in processing for adjusting time information of annotation information. For example, the synchronization unit 318 can set a predetermined offset to time information of annotation information in a case where the timing of an action call in an associated shot video is set to reference time information 00:00, thus adjusting time information. Then, the annotation information superimposition unit 1101 can superimpose annotation information appended to an associated shot video on a taken video in such a manner that the annotation information is displayed at earlier timing than the timing at which the annotation information has been appended to the associated shot video. More specifically, the annotation information superimposition unit 1101 can superimpose annotation information appended to an associated shot video on a taken video in such a manner that the annotation information is displayed at earlier timing by a predetermined offset (a predetermined time) than the timing at which the annotation information has been appended to the associated shot video. These processing operations allow the user, after confirming, in advance, annotation information that has previously been appended to an associated shot video, to perform shooting corresponding to the timing at which the annotation information has been appended.

Furthermore, although, in the second exemplary embodiment, all the pieces of annotation information appended to an associated shot video are superimposed on a taken video, this is not limiting. For example, the imaging apparatus 102 or the tablet apparatus 104 can be provided with a selection unit for selecting the type of annotation information to display, thus implementing a configuration to display annotation information required for the imaging apparatus 102 to perform shooting. With this configuration, since annotation information that is not required for shooting is not displayed, a simple display can be provided. Accordingly, a video processing system allowing the user to more easily view and confirm a required point of attention as compared with a case where all of the pieces of annotation information are displayed can be provided.

In the above-described first exemplary embodiment and second exemplary embodiment, such a configuration is employed that, as illustrated in FIG. 8A, a position on an image at which annotation information is appended is indicated with a cursor and supplementary information related to the annotation information is displayed as text information. On the other hand, in a third exemplary embodiment, the shape or manner of display of annotation information is changed based on the type of appended annotation information.

Figure 14:
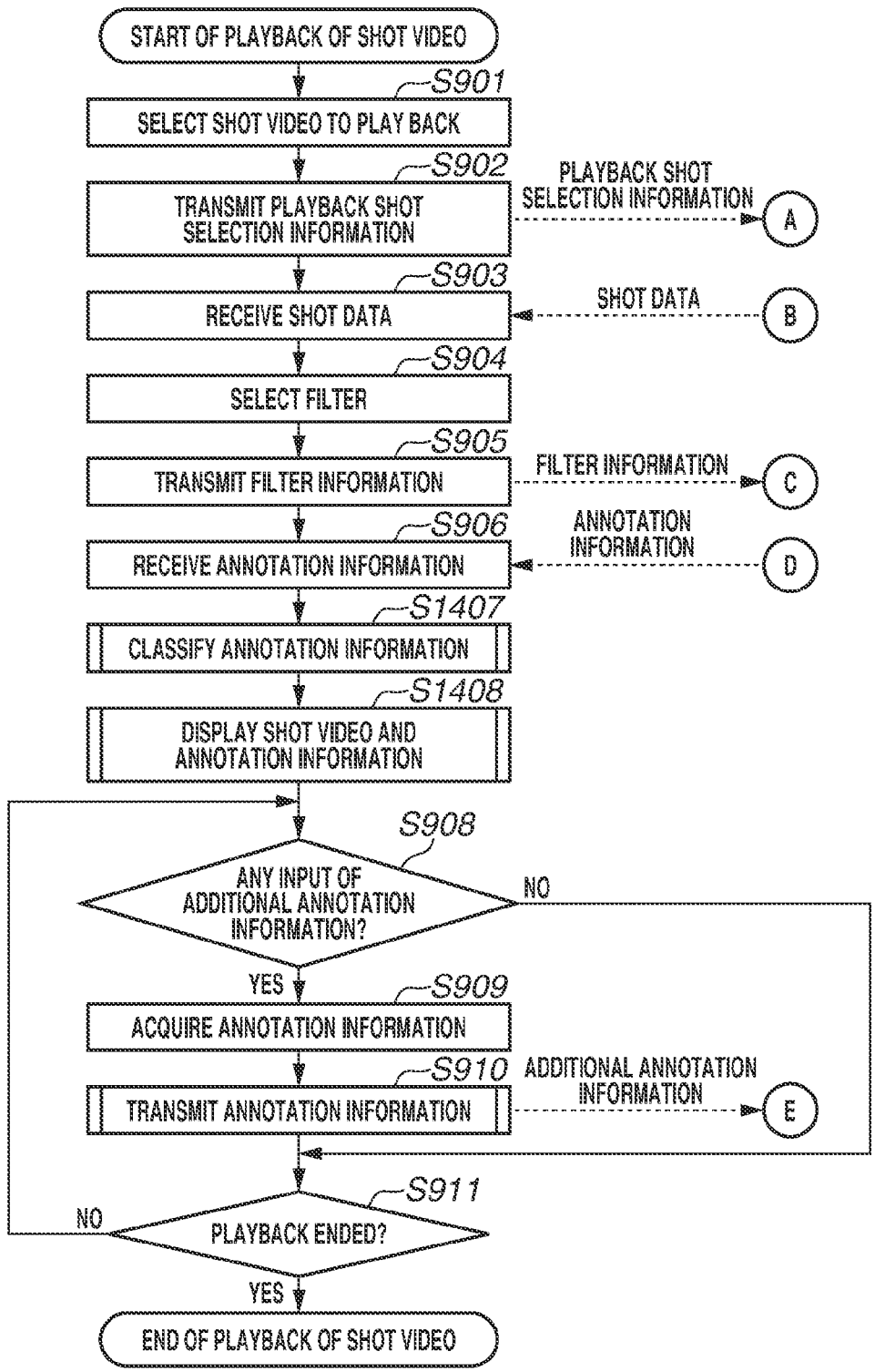
FIG. 14 is a flowchart illustrating processing procedures performed by a tablet apparatus according to a third exemplary embodiment.

FIG. 14 is a flowchart illustrating procedures of processing performed by the tablet apparatus 104 when a shot video is played back according to the third exemplary embodiment. The flowchart illustrated in FIG. 14 is implemented by the CPU 501 of the tablet apparatus 104 executing a control program stored in the ROM 502 and performing computation and conversion of information and control over each hardware. Furthermore, a part of or all of the steps illustrated in the flowchart of FIG. 14 can be implemented by hardware, such as application specific integrated circuits (ASIC). Furthermore, in FIG. 14, steps for performing respective equivalent processing operations to those in the steps illustrated in FIG. 9A of the first exemplary embodiment are assigned the respective same step numbers, and the description thereof is, therefore, not repeated.

In step S1407, the annotation output unit 319 classifies the annotation information received in step S906 based on classification information. The classification information as used herein refers to information (the information 1002 illustrated in FIG. 10) indicating "GOOD/NG" about the annotation information and/or information indicating whether the annotation information is the one that has been appended to a shot video to play back. In other words, in step S1407 in the third exemplary embodiment, the annotation output unit 319 determines whether the information indicating "GOOD/NG" about the annotation information is GOOD (successful) or NG (unsuccessful). Furthermore, the annotation output unit 319 determines whether the annotation information is the one that has been appended to a shot video (the present take) to play back, or whether the annotation information is the one that has been appended to an associated shot video (another take) that is associated with the shot video to play back. Then, the annotation output unit 319 classifies the received annotation information based on the classification information and assigns shapes of cursors corresponding to the respective classified items, as illustrated in FIG. 15B. More specifically, in the third exemplary embodiment, four different shapes of cursors are assigned to respectively indicate the classified items "GOOD in the present take", "NG in the present take", "GOOD in another take", and "NG in another take".

Then, in step S1408, the annotation output unit 319 and the shot output unit 322 perform control to display, on the display unit 321, the data of a proxy video received in step S903 and the annotation information received in step S906. Furthermore, in step S1408 in the third exemplary embodiment, the annotation output unit 319 performs control to display the annotation information using a shape of cursor assigned based on the classification information in step S1407.

FIG. 15A illustrates a display screen on the display unit 321 of the tablet apparatus 104 displayed when the processing illustrated in FIG. 14 of the third exemplary embodiment is performed to play back a shot video. Furthermore, in FIG. 15A, portions having the respective same functions as those of the portions illustrated in FIG. 8A of the first exemplary embodiment are assigned the respective same reference numerals, and the description thereof is, therefore, not repeated. The tablet apparatus 104 displays a cursor 1511 illustrated in FIG. 15B at a position 1509 at which information indicating NG as annotation information has been appended in another take, as illustrated in FIG. 15A. Furthermore, the tablet apparatus 104 displays a cursor 1512 illustrated in FIG. 15B at a position 1510 at which information indicating GOOD as annotation information has been appended in the present take, as illustrated in FIG. 15A. In this way, both the annotation information "GOOD in the present take", which has been appended to a shot video (the present take) to play back and the annotation information "NG (background) in take 4", which has been appended to an associated shot video (another take) are displayed (superimposed) together as text information. This superimposed display allows the user to confirm, as a point of attention, time information and position information of each of respective pieces of annotation information appended to a shot video to play back and an associated shot video.

As described above, the video processing system according to the third exemplary embodiment is able to display both a video (a specific shot video) and annotation information appended to another video associated with the specific shot video (an associated shot video). In other words, the video processing system according to the third exemplary embodiment is able to display, when playing back a specific shot video, annotation information appended to an associated shot video that is replaceable with the specific shot video. Then, even during playback of a specific shot video, the video processing system allows the user to determine whether to use the specific shot video for video content in consideration of annotation information of an associated shot video.

Furthermore, the video processing system according to the third exemplary embodiment displays, when playing back a specific shot video, a portion of attention and a content thereof, which are indicated by annotation information appended to a shot video (an associated shot video) of another take associated with the specific shot video. With this display, in a case where there are shot videos of a plurality of takes in the same shot, the user can view and confirm a point of attention in the specific shot video, and can more easily select a shot video used to generate video content than ever before.

Moreover, the video processing system according to the third exemplary embodiment is able to change a form of display based on the type of appended annotation information. Accordingly, since annotation information can be discriminated based on the form of display, a video processing system allowing the user to more easily discriminate annotation information as compared with a case where a video processing system displays annotation information using a cursor and text information can be provided.

Additionally, in the third exemplary embodiment, the video processing system classifies annotation information based on information indicating "GOOD/NG" as the information 1002 illustrated in FIG. 10 and information indicating whether the annotation information is the one appended to a shot video that is being played back. However, this is not limiting. For example, the video processing system can classify annotation information based on the information 1003 and/or the information 1004 illustrated in FIG. 10 or other information, thus changing a form of display based on a result of the classification.

Furthermore, in the third exemplary embodiment, during playback of a specific shot video, the video processing system changes the form of display of annotation information appended to an associated shot video based on the type of the annotation information. However, this is not limiting. For example, the video processing system can change the form of display of annotation information appended to an associated shot video based on the type of the annotation information during shooting of a specific shot video. In this case, a processing unit included in the imaging apparatus 102 (for example, the annotation information superimposition unit 1101 illustrated in FIG. 11) can perform processing that the annotation output unit 319 of the tablet apparatus 104 would perform.

The video processing system according to each of the above-described first exemplary embodiment, second exemplary embodiment, and third exemplary embodiment is configured to display all of associated pieces of annotation information that have been subjected to filter processing in the storage apparatus 103. On the other hand, a video processing system according to a fourth exemplary embodiment is configured to integrate pieces of annotation information that are proximate or the same in at least one of time information indicating the time at which annotation information has been appended, position information indicating the position on an image at which annotation information has been appended, and information about the content (type) of annotation information, into integrated annotation information and to display the integrated annotation information.

FIG. 16 is a flowchart illustrating processing performed by the tablet apparatus 104 when a shot video is played back according to the fourth exemplary embodiment. The flowchart illustrated in FIG. 16 is implemented by the CPU 501 of the tablet apparatus 104 executing a control program stored in the ROM 502 and performing computation and conversion of information and control over each hardware. Furthermore, a part of or all of the steps illustrated in the flowchart of FIG. 16 can be implemented by hardware, such as application specific integrated circuits (ASIC). Furthermore, in FIG. 16, steps for performing respective equivalent processing operations to those in the steps illustrated in FIG. 9A of the first exemplary embodiment are assigned the respective same step numbers, and the description thereof is, therefore, not repeated.

In step S1607, the annotation output unit 319 extracts a set (group or pair) of pieces of annotation information that are proximate or the same in time information from among pieces of annotation information corresponding to a selected shot video and an associated take. Here, pieces of annotation information that are proximate or the same in time information are described with reference to FIG. 3A. Referring to FIG. 3A, pieces of information 1701 to 1707 indicate times of respective pieces of annotation information appended to respective shot videos of take 1 to take 6. Furthermore, as illustrated in FIG. 3A, the time at the middle of a time (period) at which the information 1701 has been appended is referred to as time of appending of annotation information 1708. With regard to the other pieces of information 1702 to 1707, similarly, the time at the middle of a time at which each of the pieces of information 1702 to 1707 has been appended is referred to as time of appending of each of the pieces of information 1702 to 1707. Moreover, as illustrated in FIG. 3A, a period for which annotation information is displayed on the display screen for a shot video is referred to as a period of display of annotation information 1709.

The annotation output unit 319 can use various methods for determining whether pieces of annotation information are proximate or the same in time information. However, in the fourth exemplary embodiment, the annotation output unit 319 uses a method including the following two stages. In the first stage, the annotation output unit 319 extracts a set of pieces of annotation information the periods of display of which overlap from among pieces of annotation information received from the storage apparatus 103. Then, in the second stage, the annotation output unit 319 makes a determination about a time distance (difference) between the middle times of the respective pieces of annotation information with respect to the set of pieces of annotation information extracted in the first stage.

Here, with the pieces of annotation information (pieces of information 1701 to 1707) illustrated in FIG. 3A taken as an example, the details of processing performed by the annotation output unit 319 are described. In the first stage, the annotation output unit 319 extracts, from among the pieces of information 1701 to 1707, a first set of information 1703 and information 1704 and a second set of information 1705 and information 1706, each of which is a set of pieces of annotation information the periods of display of which overlap. Next, in the second stage, the annotation output unit 319 measures the time distance between middle times of respective pieces of annotation information of each set (each of the first set and the second set), and determines whether the measured time distance exceeds a predetermined determination reference value. Then, the annotation output unit 319 extracts a set the measured time distance of which is smaller than the predetermined determination reference value as pieces of annotation information that are proximate or the same in time information.

For example, in the fourth exemplary embodiment, when it is supposed that the predetermined determination reference value is 1 second (sec), the annotation output unit 319 determines whether the time distance between middle times of respective pieces of annotation information is larger than 1 sec. Then, as illustrated in FIG. 3A, the time distance between middle times of information 1703 and information 1704 of the first set is 0.5 sec, and the time distance between middle times of information 1705 and information 1706 of the second set is 1.2 sec. Based on the above, the annotation output unit 319 extracts the information 1703 and information 1704 of the first set, the time distance of which is smaller than the predetermined determination reference value (1 sec), as a set of pieces of annotation information that are proximate or the same in time information.

Figure 3B:
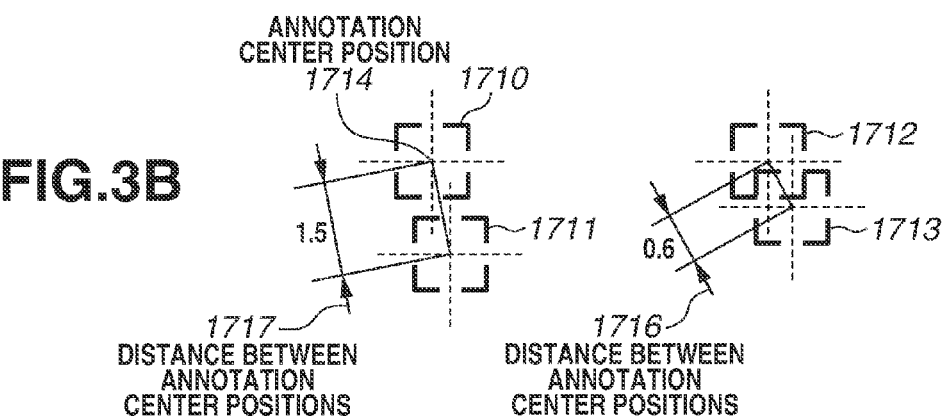

Then, in step S1608, the annotation output unit 319 extracts a set of pieces of annotation information that are proximate or the same in position (coordinates) on an image at which each annotation information has been appended with respect to the sets of pieces of annotation information extracted in step S1607. Here, a set of pieces of annotation information that are proximate or the same in position is described with reference to FIG. 3B. Referring to FIG. 3B, cursors 1710 to 1713 are illustrated at positions corresponding to the positions on a display screen at which the pieces of annotation information (pieces of information 1703 to 1706) extracted in step S1607 are displayed. Furthermore, in FIG. 3B, the center position of the position corresponding to each information is indicated with an intersection point of dashed lines. For example, as illustrated in FIG. 3B, the center position of the position of the cursor 1710 corresponding to the information 1703 is referred to as an annotation center position 1714.

The annotation output unit 319 can use various methods for determining whether pieces of annotation information are proximate or the same in position. However, in the fourth exemplary embodiment, the annotation output unit 319 uses the following method. The annotation output unit 319 calculates the coordinate distance (difference) between the center positions of the positions of the pieces of annotation information extracted in step S1607, and determines whether the calculated coordinate distance exceeds a predetermined determination reference value. Then, the annotation output unit 319 extracts a set of pieces of annotation information the calculated coordinate distance of which is smaller than the predetermined determination reference value as a set of pieces of annotation information that are proximate or the same in position. Additionally, it is desirable that the unit of coordinate distance as used herein be determined based on the resolution used when annotation information is appended or the resolution of a screen used for displaying annotation information. In the fourth exemplary embodiment, the unit symbol of the coordinate distance is omitted as illustrated in FIG. 3B.

For example, in the fourth exemplary embodiment, the predetermined determination reference value is set to 1 evaluation value, and the annotation output unit 319 determines whether the coordinate distance between the center positions of the pieces of annotation information is larger than 1 evaluation value. Then, as illustrated in FIG. 3B, the coordinate distance 1717 between the center positions of positions of the cursors 1710 and 1711 corresponding to the pieces of information 1703 and 1704 of the first set is 1.5 evaluation value. Moreover, the coordinate distance 1716 between the center positions of positions of the cursors 1712 and 1713 corresponding to the pieces of information 1705 and 1706 of the second set is 0.6 evaluation value. Based on the above, the annotation output unit 319 extracts the information 1705 and information 1706 of the second set, the coordinate distance of which is smaller than the predetermined determination reference value (1 evaluation value), as a set of pieces of annotation information that are proximate or the same in position. Additionally, the information 1705 and information 1706 of the second set are pieces of annotation information corresponding to the cursor 1712 and cursor 1713, respectively.

As a result, in step S1609, the annotation output unit 319 performs the following processing on pieces of annotation information that are determined to be proximate or the same in time information, which indicates the time at which each annotation information has been appended, and to be proximate or the same in position at which each annotation information has been appended. More specifically, in step S1610, the annotation output unit 319 integrates (combines) the information 1705 and information 1706 of the second set as pieces of annotation information that are proximate or the same in time information and proximate or the same in position into integrated annotation information. Then, in step S1611, the annotation output unit 319 performs control to display the integrated annotation information on the display unit 321. Furthermore, in step S1611, the annotation output unit 319 performs control to set the center between the center positions of the respective pieces of annotation information that are proximate or the same in time information and proximate or the same in position as the position of the integrated annotation information to display the integrated annotation information.

Figure 3C:
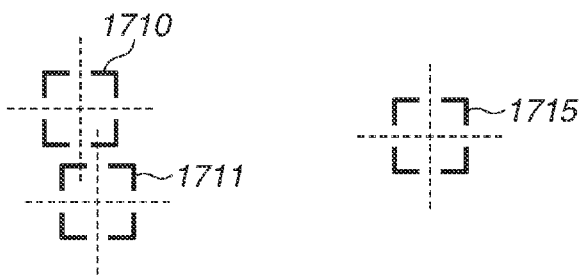

Here, FIG. 3C illustrates an example of display of pieces of annotation information appended to another shot video when the processing illustrated in FIG. 16 of the fourth exemplary embodiment is performed to play back a shot video. In a case where pieces of annotation information (pieces of information 1703 to 1706) are added to another shot video as illustrated in FIG. 3B described above, the tablet apparatus 104 in the fourth exemplary embodiment performs the processing illustrated in FIG. 16. Then, the annotation output unit 319 displays the cursors 1710, 1711, and 1715 corresponding to the respective pieces of information 1703 to 1706, as illustrated in FIG. 3C. Additionally, the cursor 1715 illustrated in FIG. 3C is displayed at the center between the center position of the cursor 1712 and the center position of the cursor 1713 illustrated in FIG. 3B.

As described above, the video processing system according to the fourth exemplary embodiment is able to display both a video (a specific shot video) and annotation information appended to another video associated with the specific shot video (an associated shot video). In other words, the video processing system according to the fourth exemplary embodiment is able to display, when playing back a specific shot video, annotation information appended to an associated shot video that is replaceable with the specific shot video. Then, even during playback of a specific shot video, the video processing system allows the user to determine whether to use the specific shot video for video content in consideration of annotation information of an associated shot video.

Furthermore, the video processing system according to the fourth exemplary embodiment displays, when playing back a specific shot video, a portion of attention and a content thereof, which are indicated by annotation information appended to a shot video (an associated shot video) of another take associated with the specific shot video. With this display, in a case where there are shot videos of a plurality of takes in the same shot, the user can view and confirm a point of attention in the specific shot video, and can more easily select a shot video used to generate video content than ever before.

Moreover, the video processing system according to the fourth exemplary embodiment combines pieces of annotation information that are proximate or the same in information related to the time and position at which each annotation information has been appended into integrated annotation information and displays the integrated annotation information. Accordingly, even in a case where a plurality of pieces of annotation information has been appended, the plurality of pieces of annotation information can be prevented from being displayed in an overlapping manner on the display screen. In other words, a video processing system allowing the user to more easily view and confirm annotation information even in a case where a plurality of pieces of annotation information has been appended, as compared with a case where all of the pieces of annotation information are displayed, can be provided.

Furthermore, in the fourth exemplary embodiment, the video processing system integrates pieces of annotation information based on a determination as to whether pieces of annotation information are proximate or the same in the time and position at which each annotation information has been appended, this is not limiting. For example, the video processing system integrates pieces of annotation information based on at least one of the time, position, and content (type) of annotation information. The content (type) of annotation information includes, for example, the categories of annotation information illustrated in FIG. 10 and the classification of annotation information such as that described with reference to FIG. 15B in the third exemplary embodiment. Thus, the video processing system can combine pieces of annotation information that are similar or the same in the broad category indicated by the information 1003 and/or the narrow category indicated by the information 1004 illustrated in FIG. 10 into integrated annotation information to display the integrated annotation information. Moreover, the video processing system can combine pieces of annotation information that are the same in information about GOOD/NG indicated by the information 1002 illustrated in FIG. 10 into integrated annotation information to display the integrated annotation information. Additionally, the video processing system can combine pieces of annotation information to which the same cursor shape is assigned into integrated annotation information based on information about the present take/another take or information about GOOD/NG as illustrated in FIG. 15B to display the integrated annotation information.

Furthermore, in the fourth exemplary embodiment, the video processing system displays pieces of annotation information that are proximate or the same in the time and position at which each annotation information has been appended using a cursor having the same shape as that of a cursor used for pieces of annotation information that are neither proximate nor the same in the time and position at which each annotation information has been appended, as illustrated in FIGS. 3B and 3C. However, this is not limiting. For example, the video processing system can display the integrated annotation information in such a manner as to enable the user to easily view and confirm the integrated annotation information. In other words, in a case where pieces of annotation information are integrated into integrated annotation information to be displayed, the video processing system can display the integrated annotation information using a cursor different from a cursor used in a case where pieces of annotation information are not integrated to be displayed. For example, the video processing system can display the cursor, which is obtained by combining cursors to display, in a thicker shape, in a larger shape, in a different color, or in a blinking manner as compared with that in a case where the cursors are displayed without being integrated. Furthermore, in the fourth exemplary embodiment, the video processing system can also display, as auxiliary information, information indicating that pieces of annotation information have been integrated.

Moreover, in the fourth exemplary embodiment, during playback of a specific shot video, the video processing system integrates pieces of annotation information appended to an associated shot video into integrated annotation information based on at least one of the time information, position information, and information on the content (type) of the pieces of annotation information, and displays the integrated annotation information. However, the video processing system according to the fourth exemplary embodiment is not limited to this. For example, as described in the second exemplary embodiment, during shooting of a specific shot video, the video processing system can integrate pieces of annotation information appended to an associated shot video into integrated annotation information based on at least one of the time information, position information, and information on the content (type) of the pieces of annotation information, and can display the integrated annotation information. In this case, a processing unit included in the imaging apparatus 102 (for example, the annotation information superimposition unit 1101 illustrated in FIG. 11) can perform processing that the annotation output unit 319 of the tablet apparatus 104 would perform.

Although, in each of the above-described first to fourth exemplary embodiments, the video processing system is composed of a plurality of apparatuses 101 to 105, this is not limiting. For example, the video processing system can be configured such that any one of the apparatuses 101 to 105 contains the other apparatus or apparatuses, or can be configured such that the apparatuses 101 to 105 are combined into a single apparatus. Furthermore, the imaging apparatus 102 and the storage apparatus 103 can be combined into a single apparatus, or the imaging apparatus 102 and the tablet apparatus 104 can be combined into a single apparatus. Moreover, the tablet apparatus 104 and the editing apparatus 105 can be combined into a single apparatus. Additionally, the tablet apparatus 104 can be composed of a display apparatus including the display unit 321 and a control apparatus including the other processing units of the tablet apparatus 104.

Furthermore, although, in each of the above-described first to fourth exemplary embodiments, the video processing system includes a single imaging apparatus 102, this is not limiting. The video processing system can include a plurality of imaging apparatuses 102. In such a case, the plurality of imaging apparatuses 102 transmit shot videos obtained by shooting to the storage apparatus 103, and the storage apparatus 103 stores the received shot videos. Then, the storage apparatus 103 can extract, from the stored shot videos, a shot video associated with a shot video selected by the tablet apparatus 104, and can display the extracted shot video on at least one of the plurality of imaging apparatuses 102 and/or the tablet apparatus 104.

Moreover, although, in each of the above-described first to fourth exemplary embodiments, the video processing system indicates, with a cursor or cursors, the position or positions at which annotation information has been appended as illustrated in FIG. 6B, FIG. 8A, FIG. 13, and FIGS. 15A and 15B, this is not limiting. For example, as indicated by the information 1005 illustrated in FIG. 10, the video processing system can indicate the position at which annotation information has been appended with a range, such as "right end" or "center", or with text.

Furthermore, although, in each of the above-described first to fourth exemplary embodiments, during playback or shooting of a specific shot video, the video processing system displays annotation information appended to another shot associated with the specific shot video, the video processing system can display the other shot in different methods for the respective takes. For example, in a case where there is a plurality of shot videos associated with a specific shot video (shot videos of other takes in the same shot), the video processing system can display a cursor and/or text corresponding to annotation information in different colors for the respective takes.

Additionally, although, in each of the above-described first to fourth exemplary embodiments, the tablet apparatus 104 is configured to receive data of a proxy video transmitted from the imaging apparatus 102 via the storage apparatus 103 and to display the received data of a proxy video on the display unit 321, this is not limiting. For example, the tablet apparatus 104 can receive video data generated by the imaging unit 304 of the imaging apparatus 102 and can display the received video data on the display unit 321. Furthermore, the tablet apparatus 104 can append annotation information to data of a proxy video displayed on the display unit 321, or can append annotation information to video data generated by the imaging unit 304 of the imaging apparatus 102. Moreover, when displaying data of a proxy video on the display unit 321, the tablet apparatus 104 can append annotation information to both the displayed data of a proxy video and video data corresponding to the data of a proxy video.

The present invention can also be implemented by processing for supplying a program that implements one or more functions of the above-described exemplary embodiments to a system or apparatus via a network or a storage medium and causing one or more processors included in the system or apparatus to read and execute the program. Furthermore, present invention can also be implemented by a circuitry that implements one or more functions (for example, application specific integrated circuits (ASIC)).

According to the present invention, both a video and annotation information corresponding to another video associated with the first-mentioned video can be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110216 filed May 29, 2015, which is hereby incorporated by reference herein in its entirety.

What is claimed is:

1. A video processing apparatus comprising:
an acquisition unit configured to acquire annotation information corresponding to at least one associated video, which is associated with a video that is to be processed;
a synchronization unit configured to perform synchronization processing between the video that is to be processed and the associated video based on time information indicating times of respective predetermined pieces of identification information of the video that is to be processed and the associated video; and
a display control unit configured to perform control to display, on a display screen for displaying the video that is to be processed, both the annotation information corresponding to the associated video acquired by the acquisition unit and the video that is to be processed,
wherein the display control unit performs control to display annotation information corresponding to the associated video on which the synchronization processing has been performed by the synchronization unit at a position on the video that is to be processed corresponding to a position at which the annotation information is assigned on the associated video.

2. The video processing apparatus according to claim 1, wherein the video that is to be processed is a video that is to be played back, and the associated video is a video associated with the video that is to be played back.

3. The video processing apparatus according to claim 1, wherein the video that is to be processed is a video that is being taken, and the associated video is a previously taken video associated with the video that is being taken.

4. The video processing apparatus according to claim 3, wherein, based on time information of annotation information appended to the associated video acquired by the acquisition unit, the display control unit performs control to display annotation information appended to the associated video at timing earlier than timing on the associated video indicated by the time information.

5. The video processing apparatus according to claim 1, wherein the display control unit determines, based on a type of the annotation information corresponding to the associated video acquired by the acquisition unit, a form of display of the annotation information.

6. The video processing apparatus according to claim 1, further comprising a second acquisition unit configured to acquire annotation information corresponding to the video that is to be processed,
wherein the display control unit performs control to display, on the display screen for displaying the video that is to be processed, the annotation information corresponding to the associated video acquired by the acquisition unit, and the annotation information corresponding to the video that is to be processed.

7. The video processing apparatus according to claim 5, wherein the display control unit performs control, when displaying both annotation information corresponding to the video that is to be processed and second annotation information corresponding to the associated video, to display, based on information indicating whether annotation information corresponds to the video that is to be processed or corresponds to the associated video and information indicating appropriateness of a video, a graphic having a shape corresponding to the annotation information.

8. The video processing apparatus according to claim 1, wherein, when displaying a plurality of pieces of annotation information, the display control unit performs control to integrate pieces of annotation information that are proximate or the same in at least one of time, position, and type from among the plurality of pieces of annotation information into integrated annotation information and to display the integrated annotation information.

9. The video processing apparatus according to claim 1, wherein the synchronization unit performs the synchronization processing between the video that is to be processed and the associated video based on the time information corresponding to at least one of specific sound information, image feature information, shooting setting information, and object position information during shooting of each of the video that is to be processed and the associated video.

10. A video processing method for a video processing apparatus, the video processing method comprising:

acquiring annotation information corresponding to at least one associated video, which is associated with a video that is to be processed;

performing synchronization processing between the video that is to be processed and the associated video based on time information indicating times of respective predetermined pieces of identification information of the video that is to be processed and the associated video; and performing control to display, on a display screen for displaying the video that is to be processed, both the acquired annotation information corresponding to the associated video and the video that is to be processed, wherein performing control includes performing control to display annotation information corresponding to the associated video on which the synchronization processing has been performed at a position on the video that is to be processed corresponding to a position at which the annotation information is assigned on the associated video.

11. A non-transitory computer-readable storage medium storing computer-executable instructions that, when executed by a computer, cause the computer to perform a video processing method for a video processing apparatus, the video processing method comprising:

acquiring annotation information corresponding to at least one associated video, which is associated with a video that is to be processed;

performing synchronization processing between the video that is to be processed and the associated video based on time information indicating times of respective predetermined pieces of identification information of the video that is to be processed and the associated video; and performing control to display, on a display screen for displaying the video that is to be processed, both the acquired annotation information corresponding to the associated video and the video that is to be processed, wherein performing control includes performing control to display annotation information corresponding to the associated video on which the synchronization processing has been performed at a position on the video that is to be processed corresponding to a position at which the annotation information is assigned on the associated video.

\* \* \* \* \*